(12) United States Patent
Wang et al.

(10) Patent No.: US 12,316,834 B2
(45) Date of Patent: *May 27, 2025

(54) COEFFICIENTS CODING IN TRANSFORM SKIP MODE

(71) Applicants: Beijing Bytedance Network Technology Co., Ltd., Beijing (CN); Bytedance Inc., Los Angeles, CA (US)

(72) Inventors: Ye-kui Wang, San Diego, CA (US); Weijia Zhu, San Diego, CA (US); Li Zhang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,737

(22) Filed: Nov. 22, 2023

(65) Prior Publication Data

US 2024/0098253 A1 Mar. 21, 2024

Related U.S. Application Data

(63) Continuation of application No. 17/955,719, filed on Sep. 29, 2022, which is a continuation of application No. PCT/CN2021/084869, filed on Apr. 1, 2021.

(30) Foreign Application Priority Data

Apr. 2, 2020 (WO) ................ PCT/CN2020/082983

(51) Int. Cl.
*H04N 19/105* (2014.01)
*H04N 19/169* (2014.01)
(Continued)

(52) U.S. Cl.
CPC ......... *H04N 19/105* (2014.11); *H04N 19/176* (2014.11); *H04N 19/188* (2014.11); *H04N 19/46* (2014.11)

(58) Field of Classification Search
CPC .. H04N 19/105; H04N 19/176; H04N 19/188; H04N 19/46
See application file for complete search history.

(56) References Cited

U.S. PATENT DOCUMENTS

2006/0222254 A1* 10/2006 Zandi ..................... H04N 19/61
375/E7.093
2013/0114694 A1* 5/2013 Chen ..................... H04N 19/70
375/240.03
(Continued)

FOREIGN PATENT DOCUMENTS

GB 2593543 A 9/2021
JP 7575478 B2 10/2024
(Continued)

OTHER PUBLICATIONS

ITU-T "Series H: Audiovisual and Multimedia Systems Infrastructure of audiovisual services—Coding of moving video; High efficiency video coding," Rec. ITU-T H.265 | ISO/IEC 23008-2 (in force edition), Nov. 2019, 712 pages.
(Continued)

*Primary Examiner* — Jeremiah C Hallenbeck-Huber
(74) *Attorney, Agent, or Firm* — Conley Rose, P.C.

(57) ABSTRACT

Methods and apparatus for video processing are disclosed. The processing may include video encoding, video decoding, or video transcoding. One example method includes performing a conversion between a current block of a video and a bitstream of the video. The bitstream conforms to a rule that specifies that a context index offset is used for including a first sign flag of a first coefficient in the bitstream. The rule specifies that a value of the context index (Continued)

offset is based on whether a first coding mode is applied on the current block in the bitstream.

20 Claims, 17 Drawing Sheets

(51) Int. Cl.
    *H04N 19/176*     (2014.01)
    *H04N 19/46*     (2014.01)

(56) References Cited

U.S. PATENT DOCUMENTS

| | | | | |
|---|---|---|---|---|
| 2014/0003489 | A1* | 1/2014 | Hannuksela | H04N 19/30 375/240.02 |
| 2014/0219346 | A1* | 8/2014 | Ugur | H04N 19/58 375/240.12 |
| 2015/0264404 | A1* | 9/2015 | Hannuksela | H04N 19/30 375/240.16 |
| 2020/0275111 | A1* | 8/2020 | Zhao | H04N 19/46 |
| 2020/0296420 | A1* | 9/2020 | Karczewicz | H04N 19/176 |

FOREIGN PATENT DOCUMENTS

| | | | |
|---|---|---|---|
| WO | 2013070703 | A1 | 5/2013 |
| WO | 2019240539 | A1 | 12/2019 |
| WO | 2020009758 | A1 | 1/2020 |

OTHER PUBLICATIONS

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., VTM software: https://vcgit.hhi.fraunhofer.de/jvet/VVCSoftware_VTM.git, Dec. 20, 2022, 3 pages.
Document: JVET-N0280, Bross, B., et al., "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-O0081-v2, Tsukuba, T., et al., "CE8: Chroma Transform Skip (CE8-3.2)," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-O0122-v3, Karczewicz, M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WVG 11 15th Meeting: Gothenburg, SE, Jul. 3-12, 2019, 27 pages.
Document: JVET-O0556, Karczewicz, M., et al., "CE7-related: Alternative method to RDPCM with TS level mapping," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-O0512, Keating, S., et al., "Non-CE3: CCLM Coding bug fix," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-N1001-v1, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 350 pages.
Document: JVET-O0246-v1, Seregin, V., et al., "AHG17: Separate luma and chroma ALF APS types," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JCTVC-J0072r1, Hannuksela, M., et al., "AHG9 High-Level Syntax: APS loss detection," Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, 4 pages.
Document: JVET-O0122-v2, Auyeung, C., et al., "CE7-related: Modifications to transform skip coefficient sign flag coding," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.
Document: JVET-P0437-r1, Karczewicz, M., et al., CE7: Sign context, level mapping, and bitplane coding for TS residual coding (CE7-3.7, CE7-3.8, CE7-3.9, CE7-3.10, and CE7-3.11), Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
Foreign Communication From a Related Counterpart Application, PCT Application No. PCT/CN2021/084869, English Translation of International Search Report dated Jun. 25, 2021, 12 pages.
Foreign Communication From a Related Counterpart Application, PCT Application No. PCT/CN2021/084870, English Translation of International Search Report dated Jun. 30, 2021, 13 pages.
Foreign Communication From A Related Counterpart Application, European Application No. 21781004.3, Partial Supplementary European Search Report dated Jun. 23, 2023, 14 pages.
Non-Final Office Action from U.S. Appl. No. 17/955,719 dated Apr. 27, 2023, 18 pages.
Document: JVET-00122-3, Karczewicz,. M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, Jul. 3-12, 2019, 27 pages.
Document: JVET-Q2001-v9, Bross, B., et al., "Versatile Video Coding (Draft 8)," Joint Video Experts Team (JVET) of ITU-T SG 16 WP 3 and 1S0/IEC JTC 1/SC 29/WG 11 Document: JVET-Q2001-v9 17th Meeting: Brussels, BE, Jan. 7-17, 2020, 17 pages.
Document: JVET-P2001-v3, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 15 pages.
Final Office Action from U.S. Appl. No. 17/955,719 dated Mar. 29, 2024, 14 pages.
Japanese Office Action from Japanese Patent Application No. 2022-559412 dated Apr. 9, 2024, 16 pages. With English Translation.
Decision to Grant a Patent for Japanese Patent Application No. 2022-559412, mailed Sep. 17, 2024, 7 pages.
Document: JVET-R0070-v1, Wang, Y.K., et al., "AHG9: On repetition and update of non-VCL data units," Joint Video Experts Team (JVET) of ITU-T SG 16 WP 3 and ISO/IEC JTC 1/SC 29/WG 11 18th Meeting: by teleconference, 1524 Apr. 2020, 4 pages.
Examination Report from Indian Patent Application No. 202247055986 dated Dec. 22, 2022, 6 pages.
Extended European Search Report for European Application No. 21781004.3, mailed Sep. 25, 2023, 11 Pages.
International Preliminary Report on Patentability for International Application No. PCT/CN2021/084869, mailed Oct. 13, 2022, 8 pages.
International Preliminary Report on Patentability for International Application No. PCT/CN2021/084870, mailed Oct. 13, 2022, 8 pages.
Office action for Japanese Patent Application No. 2022-559412, mailed Oct. 17, 2023, 20 pages.
Wang Y.K., et al., "AHG9: Cleanups on Parameter Sets," Joint Video Experts Team (JVET) of ITU-T SG 16 WP 3 and ISO/IEC

(56) References Cited

OTHER PUBLICATIONS

JTC 1/SC 29/WG 11, 17th Meeting: Brussels, BE, Jan. 7-17, 2020, Document: JVET-Q0117-v1, 9 Pages.
Document: JVET-Q0070, Ma, T-C., et al., "CE3-2.5: Residual coding selection signaling for lossless coding," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.

* cited by examiner

COEFFICIENTS CODING IN TRANSFORM SKIP MODE

CROSS REFERENCE TO RELATED APPLICATIONS

This application is a continuation of U.S. application Ser. No. 17/955,719, filed on Sep. 29, 2022, which is a continuation of International Patent Application No. PCT/CN2021/084869, filed on Apr. 1, 2021, which claims the priority to and benefits of International Patent Application No. PCT/CN2020/082983, filed on Apr. 2, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a current block of a video and a bitstream of the video, wherein the bitstream conforms to a rule that specifies that a context index offset is used for including a first sign flag of a first coefficient in the bitstream, wherein the rule specifies that a value of the context index offset is based on whether a first coding mode is applied on the current block in the bitstream.

In another example aspect, a video processing method is disclosed. The method includes performing a conversion between a current block of a video and a bitstream of the video, wherein the bitstream conforms to a rule that specifies that sign flags of the current block are included in the bitstream using any one of context mode and bypass mode based on a number of remaining context coded bins.

In another example aspect, a video processing method is disclosed. The method includes performing a conversion between a current block of a video and a bitstream of the video, wherein the bitstream conforms to a rule that specifies that a context index offset is used for including in the bitstream sign flags of the current block, and wherein the rule specifies that the context index offset is determined based on an information of the current block.

In another example aspect, a video processing method is disclosed. The method includes performing a conversion between a video comprising one or more video layers and a bitstream of the video according to a rule, wherein the rule specifies use of multiple adaptation parameter set network abstraction layer units for the video, wherein each adaptation parameter set network abstraction layer unit has a corresponding adaptation parameter type value, wherein each adaptation parameter set network abstraction layer unit is associated with a corresponding video layer identifier, wherein each adaptation parameter set network abstraction layer unit is a prefix unit or a suffix unit, and wherein the rule specifies that, responsive to the multiple adaptation parameter set network abstraction layer units sharing a same adaptation parameter type value, adaptation parameter set identifier values of the multiple adaptation parameter set network abstraction layer units belong to a same identifier space.

In another example aspect, a video processing method is disclosed. The method includes performing a conversion between a current block of a video and a bitstream of the video, wherein the bitstream conforms to a rule that specifies that a first supplementary enhancement information message having a particular characteristic is disallowed from being: (1) repeated within a slice unit in the bitstream in response to a second supplementary enhancement information message having the particular characteristic being included in the slice unit, or (2) updated in response to the first supplementary enhancement message being within the slice unit in the bitstream, wherein the slice unit includes a set of network abstraction layer units that are consecutive in a decoding order, and wherein the set of network abstraction layer includes a single coded slice and one or more non-video coding layer network abstraction layer units associated with the one single coded slice.

In another example aspect, a video processing method is disclosed. The method includes performing a conversion between a current block of a video and a bitstream of the video, wherein the bitstream conforms to a rule that specifies that specifies that a slice unit in the bitstream disallows a repetition of a first non-video coding layer network abstraction layer unit in response to: (1) the slice unit including a second non-video coding layer network abstraction layer unit having a same characteristic as that of the first non-video coding layer network abstraction layer unit, and (2) the first non-video coding layer network abstraction layer unit having a network abstraction layer unit type other than a prefix supplementary enhancement information or a suffix supplementary enhancement information.

In another example aspect, a video processing method is disclosed. The method includes performing a conversion between a video comprising multiple video layers and a bitstream of the video according to a rule, wherein the rule specifies which of a plurality of adaptation parameter sets are disallowed from being shared across the multiple video layers.

In another example aspect, a video processing method is disclosed. The method includes performing a conversion between a video comprising one or more video layers and a bitstream of the video according to a rule, wherein the bitstream comprises one or more adaptive loop filter adaptation parameter sets, and wherein the rule specifies whether the one or more adaptive loop filter adaptation parameter sets are allowed to be updated within a picture unit.

In another example aspect, a video processing method is disclosed. The method includes performing a conversion between a video comprising one or more coded layer video sequences and a bitstream of the video according to a rule, wherein the bitstream comprises an adaptive loop filter adaptation parameter set, and wherein the rule specifies that the adaptive loop filter adaptation parameter set is disallowed from being shared across the one or more coded layer video sequences in response to the adaptive loop filter adaptation parameter set having one or more particular characteristics.

In another example aspect, a video processing method is disclosed. The method includes performing a conversion between a current block of a video and a coded representation of the video. The coded representation conforms to a format rule that specifies that a context index offset used for coding sign flags of the current block in the coded representation are in a range, wherein the range function of a coding mode used to represent the current block in the coded representation.

In another example aspect, another video processing method is disclosed. The method includes: performing a conversion between a current block of a video and a coded representation of the video; wherein the coded representation conforms to a format rule that specifies that sign flags of the current block are coded in the coded representation using one of context coded bins or bypass mode depending on a number of remaining context coded bins.

In another example aspect, another video processing method is disclosed. The method includes: performing a conversion between a current block of a video and a coded representation of the video; wherein the conversion uses a block-based delta pulse code modulation (BDPCM) mode, wherein the coded representation conforms to a format rule that specifies that sign flags from the BDPCM are context coded in the coded representation such that a context index offset for coding the sign flags is a function of a coding condition of the current block.

In another example aspect, another video processing method is disclosed. The method includes: performing a conversion between a current block of a video and a coded representation of the video; wherein the coded representation conforms to a format rule that specifies that a slice unit in the coded representation, corresponding to a set of network abstraction layer units that are in a consecutive decoding order and contain a single coded slice is allowed to include at least a portion of supplementary enhancement information (SEI) at most once.

In another example aspect, another video processing method is disclosed. The method includes: performing a conversion between a current block of a video and a coded representation of the video; wherein the coded representation conforms to a format rule that specifies that a slice unit in the coded representation, corresponding to a set of network abstraction layer units that are in a consecutive decoding order and contain a single coded slice, includes one or more video coding layer network abstraction layer (VCL NAL) units, wherein the format rule further specifies a first type of units that are allowed to be repeated and a second type of units that are disallowed to be repeated in the slice unit.

In another example aspect, another video processing method is disclosed. The method includes: performing a conversion between a video comprising one or more video layers and a coded representation of the video according to a rule; wherein the coded representation comprises one or more adaptation parameter sets (APS); and wherein the rule specifies applicability of some of the one or more APS to the conversion of the one or more video layers.

In another example aspect, another video processing method is disclosed. The method includes: performing a conversion between a video comprising one or more video layers and a coded representation of the video according to a rule; wherein the coded representation is arranged into one or more network abstraction layer (NAL) units; wherein the coded representation comprises one or more adaptation parameter sets for controlling characteristics of the conversion.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

DETAILED DESCRIPTION

Figure 1:
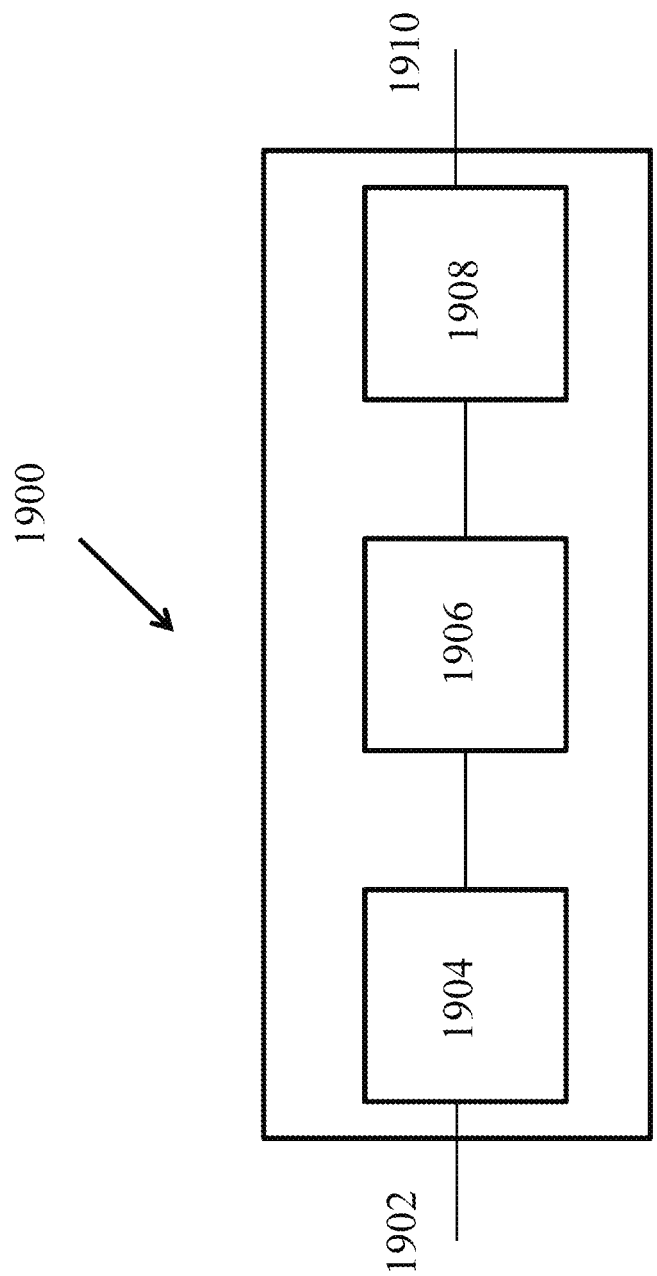
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1 Introduction

The present disclosure is related to video coding technologies. Specifically, it is related to coefficients coding in transform skip mode as well as repetition and update of non-VCL data units in video coding. It may be applied to the existing video coding standard like HEVC, or the standard (Versatile Video Coding) to be finalized. It may be also applicable to future video coding standards or video codec.

2 Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access CTB Coding Tree Block
CTU Coding Tree Unit
CVS Coded Video Sequence
DCI Decoding Capability Information
DPB Decoded Picture Buffer
DU Decoding Unit
EOB End Of Bitstream
EOS End Of Sequence
GDR Gradual Decoding Refresh
HEVC High Efficiency Video Coding
HRD Hypothetical Reference Decoder
ID Identifier
IDR Instantaneous Decoding Refresh
JEM Joint Exploration Model
LMCS Luma Mapping with Chroma Scaling
MCTS Motion-Constrained Tile Sets
NAL Network Abstraction Layer
NUT NAL Unit Type
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List
SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding

3 Video Coding Introduction

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1 Concepts and Definitions in VVC That Are Most Relevant to This Disclosure access unit (AU): A set of PUs that belong to different layers and contain coded pictures associated with the same time for output from the Decoded Picture Buffer (DPB).
adaptive loop filter (ALF): A filtering process that is applied as part of the decoding process and is controlled by parameters conveyed in an APS.
ALF APS: An APS that controls the ALF process.
adaptation parameter set (APS): A syntax structure containing syntax elements that apply to zero or more slices as determined by zero or more syntax elements found in slice headers.
associated non-VCL NAL unit: A non-VCL NAL unit (when present) for a VCL NAL unit where the VCL NAL unit is the associated VCL NAL unit of the non-VCL NAL unit.
associated VCL NAL unit: The preceding VCL NAL unit in decoding order for a non-VCL NAL unit with nal_unit_type equal to EOS_NUT, EOB_NUT, SUFFIX_APS_NUT, SUFFIX_SEI_NUT, FD_NUT, RSV_NVCL_27, or in the range of UNSPEC_30 . . . UNSPEC_31; or otherwise the next VCL NAL unit in decoding order.
decoding unit (DU): An AU if DecodingUnitHrdFlag is equal to 0 or a subset of an AU otherwise, consisting of one or more VCL NAL units in an AU and the associated non-VCL NAL units.
layer: A set of VCL NAL units that all have a particular value of nuh_layer_id and the associated non-VCL NAL units.
LMCS APS: An APS that controls the LMCS process.
luma mapping with chroma scaling (LMCS): A process that is applied as part of the decoding process that maps luma samples to particular values and may apply a scaling operation to the values of chroma samples.
picture unit (PU): A set of NAL units that are associated with each other according to a specified classification rule, are consecutive in decoding order, and contain exactly one coded picture.
scaling list: A list that associates each frequency index with a scale factor for the scaling process.
scaling list APS: An APS with syntax elements used to construct the scaling lists.
video coding layer (VCL) NAL unit: A collective term for coded slice NAL units and the subset of NAL units that have reserved values of nal_unit_type that are classified as VCL NAL units in this Specification.

3.2 Coefficients Coding in Transform Skip Mode

In the current VVC draft, several modifications are proposed on the coefficients coding in transform skip (TS) mode compared to the non-TS coefficient coding in order to adapt the residual coding to the statistics and signal characteristics of the transform skip levels. The latest texts related to this part in JVET-Q2001-vE is as follows.

7.3.10.11 Residual Coding Syntax

|  | Descriptor |
|---|---|
| residual_coding( x0, y0, log2TbWidth, log2TbHeight, cIdx ) { | |
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS = DiagScanOrder[ log2TbWidth − log2SbW ][ log2TbHeight − log2SbH ][ lastSubBlock ][ 0 ] | |
|     yS = DiagScanOrder[ log2TbWidth − log2SbW ][ log2TbHeight − log2SbH ][ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
|   } while( ( xC != LastSignificantCoeffX ) | | ( yC != LastSignificantCoeffY ) ) | |
|   if( lastSubBlock = = 0 && log2TbWidth >= 2 && log2TbHeight >= 2 && !transform_skip_flag[ x0 ][ y0 ][ cIdx ] && lastScanPos > 0 ) | |
|     LfnstDcOnly = 0 | |
|   if( ( lastSubBlock > 0 && log2TbWidth >= 2 && log2TbHeight >= 2 ) | | ( lastScanPos > 7 && ( log2TbWidth = = 2 | | log2TbWidth = = 3 ) && log2TbWidth = = log2TbHeight ) ) | |
|     LfnstZeroOutSigCoeffFlag = 0 | |
|   if( ( lastSubBlock > 0 | | lastScanPos > 0 ) && cIdx = = 0 ) | |
|     MtsDcOnly = 0 | |

-continued

|  | Descriptor |
|---|---|
|   QState = 0 | |
|   for( i = lastSubBlock; i >= 0; i− − ) { | |
|     startQStateSb = QState | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     inferSbDcSigCoeffFlag = 0 | |
|     if( i < lastSubBlock && i > 0 ) { | |
|       sb_coded_flag[ xS ][ yS ] | ae(v) |
|       inferSbDcSigCoeffFlag = 1 | |
|     } | |
|     if( sb_coded_flag[ xS ][ yS ] && ( xS > 3 | | yS > 3 ) && cIdx = = 0 ) | |
|       MtsZeroOutSigCoeffFlag = 0 | |
|     firstSigScanPosSb = numSbCoeff | |
|     lastSigScanPosSb = −1 | |
|     firstPosMode0 = ( i = = lastSubBlock ? lastScanPos : numSbCoeff − 1 ) | |
|     firstPosMode1 = firstPosMode0 | |
|     for( n = firstPosMode0; n >= 0 && remBinsPass1 >= 4; n− − ){ | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] && ( n > 0 | | !inferSbDcSigCoeffFlag ) && ( xC != LastSignificantCoeffX | | yC != LastSignificantCoeffY ) ) { | |
|         sig_coeff_flag[ xC ][ yC ] | ae(v) |
|         remBinsPass1− − | |
|         if( sig_coeff_flag[ xC ][ yC ] ) | |
|           inferSbDcSigCoeffFlag = 0 | |
|       } | |
|       if( sig_coeff_flag[ xC ][ yC ] ) { | |
|         abs_level_gtx_flag[ n ][ 0 ] | ae(v) |
|         remBinsPass1− − | |
|         if( abs_level_gtx_flag[ n ][ 0 ] ) { | |
|           par_level_flag[ n ] | ae(v) |
|           remBinsPass1− − | |
|           abs_level_gtx_flag[ n ][ 1 ] | ae(v) |
|           remBinsPass1− − | |
|         } | |
|         if( lastSigScanPosSb = = −1 ) | |
|           lastSigScanPosSb = n | |
|         firstSigScanPosSb = n | |
|       } | |
|       AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_flag[ n ][ 1 ] | |
|       if( ph_dep_quant_enabled_flag ) | |
|         QState = QStateTransTable[ QState ][ AbsLevelPass1[ xC ][ yC ] & 1 ] | |
|       firstPosMode1 = n − 1 | |
|     } | |
|     for( n = firstPosMode0; n > firstPosMode1; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( abs_level_gtx_flag[ n ][ 1 ] ) | |
|         abs_remainder[ n ] | ae(v) |
|       AbsLevel[ xC ][ yC ] = AbsLevelPass1[ xC ][ yC ] +2 * abs_remainder[ n ] | |
|     } | |
|     for( n = firstPosMode1; n >= 0; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] | |

| | Descriptor |
|---|---|
| dec_abs_level[ n ] | ae(v) |
| if( AbsLevel[ xC ][ yC ] > 0 ) { | |
|   if( lastSigScanPosSb = = −1 ) | |
|     lastSigScanPosSb = n | |
|   firstSigScanPosSb = n | |
| } | |
| if( ph_dep_quant_enabled_flag ) | |
|   QState = QStateTransTable | |
| [ QState ][ AbsLevel[ xC ][ yC ] & 1 ] | |
| } | |
| if( ph_dep_quant_enabled_flag \|\| | |
| !pic_sign_data_hiding_enabled_flag ) | |
|   signHidden = 0 | |
| else | |
|   signHidden = ( lastSigScanPosSb − | |
| firstSigScanPosSb > 3 ? 1 : 0 ) | |
| for( n = numSbCoeff − 1; n >= 0; n− − ) { | |
|   xC = ( xS << log2SbW ) + | |
| DiagScanOrder[ log2SbW ][ log2SbH ][ n ][ 0 ] | |
|   yC = ( yS << log2SbH ) + | |
| DiagScanOrder[ log2SbW ][ log2SbH ][ n ][ 1 ] | |
|   if( ( AbsLevel[ xC ][ yC ] > 0 ) && | |
|     ( !signHidden \|\| ( n != firstSigScanPosSb ) ) ) | |
|     coeff_sign_flag[ n ] | ae(v) |
| } | |
| if( ph_dep_quant_enabled_flag ) { | |
|   QState = startQStateSb | |
|   for( n = numSbCoeff − 1; n >= 0; n− − ) { | |
|     xC = ( xS << log2SbW ) + | |
| DiagScanOrder[ log2SbW ][ log2SbH ][ n ][ 0 ] | |
|     yC = ( yS << log2SbH ) + | |
| DiagScanOrder[ log2SbW ][ log2SbH ][ n ][ 1 ] | |
|     if( AbsLevel[ xC ][ yC ] > 0 ) | |
|       TransCoeffLevel[ x0 ][ y0 ][ cIdx ][ xC ][ yC ] = | |
|         ( 2 * AbsLevel[ xC ][ yC ] − | |
| ( QState > 1 ? 1 : 0 ) ) * | |
|         ( 1 − 2 * | |
| coeff_sign_flag[ n ] ) | |
|     QState = QStateTransTable | |
| [ QState ][ AbsLevel[ xC ][ yC ] & 1 ] | |
|   } else { | |
|     sumAbsLevel = 0 | |
|     for( n = numSbCoeff − 1; n >= 0; n− − ) { | |
|       xC = ( xS << log2SbW ) + | |
| DiagScanOrder[ log2SbW ][ log2SbH ][ n ][ 0 ] | |
|       yC = ( yS << log2SbH ) + | |
| DiagScanOrder[ log2SbW ][ log2SbH ][ n ][ 1 ] | |
|       if( AbsLevel[ xC ][ yC ] > 0 ) { | |
|         TransCoeffLevel[ x0 ][ y0 ][ cIdx ][ xC ][ yC ] = | |
|           AbsLevel[ xC ][ yC ] * ( 1 − | |
| 2 * coeff_sign_flag[ n ] ) | |
|         if( signHidden ) { | |
|           sumAbsLevel += | |
| AbsLevel[ xC ][ yC ] | |
|           if( ( n = = firstSigScanPosSb ) | |
| && ( sumAbsLevel % 2 ) = = 1 ) ) | |
|             TransCoeffLevel[ x0 ][ y0 ][ cIdx ][ xC ][ yC ] = | |
|               −TransCoeffLevel[ x0 ][ y0 ][ cIdx ][ xC ][ yC ] | |
|         } | |
|       } | |
|     } | |
|   } | |
| } | |

| | Descriptor |
|---|---|
| residual_ts_coding( x0, y0, log2TbWidth, log2TbHeight, cIdx ) { | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff = 1 << ( log2SbW + log2SbH ) | |
|   lastSubBlock = ( | |
| 1 << ( log2TbWidth + log2TbHeight − | |
| ( log2SbW + log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i =0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock \|\| !inferSbCbf ) | |
|       sb_coded_flag[ xS ][ yS ] | ae(v) |
|     if( sb_coded_flag[ xS ][ yS ] && i < lastSubBlock ) | |
|       inferSbCbf = 0 | |
|     /* First scan pass */ | |
|     inferSbSigCoeffFlag = 1 | |
|     lastScanPosPass1 = −1 | |
|     for( n = 0; n <= numSbCoeff − 1 && RemCcbs >= 4; n++ ) | |
|     { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( sb_coded_flag[ xS ][ yS ] && | |
|         ( n != numSbCoeff − 1 \|\| !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |
|           par_level_flag[ n ] | ae(v) |
|           RemCcbs− − | |
|         } | |
|       } | |
|       AbsLevelPass1[ xC ][ yC ] = sig_coeff_flag[ xC ][ yC ] + par_level_flag[ n ] + abs_level_gtx_flag[ n ][ 0 ] | |
|       lastScanPosPass1 = n | |
|     } | |
|     /* Greater than X scan pass (numGtXFlags=5) */ | |
|     lastScanPosPass2 = −1 | |
|     for( n = 0; n <= numSbCoeff − 1 && RemCcbs >= 4; n++ ) | |
|     { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       AbsLevelPass2[ xC ][ yC ] = AbsLevelPass1[ xC ][ yC ] | |
|       for( j = 1; j < 5; j++ ) { | |
|         if( abs_level_gtx_flag[ n ][ j − 1 ] ) { | |
|           abs_level_gtx_flag[ n ][ j ] | ae(v) |
|           RemCcbs− − | |
|         } | |
|       AbsLevelPass2[ xC ][ yC ] + = 2 * | |

-continued

| | Descriptor |
|---|---|
| abs_level_gtx_flag[ n ][ j ]<br>}<br>lastScanPosPass2 = n<br>}<br>/* remainder scan pass */<br>for( n = 0; n <= numSbCoeff − 1; n++ ) {<br>  xC = ( xS << log2SbW ) +<br>DiagScanOrder[ log2SbW ][ log2SbH ][ n ][ 0 ]<br>  yC = ( yS << log2SbH ) +<br>DiagScanOrder[ log2SbW ][ log2SbH ][ n ][ 1 ]<br>  if( ( n <= lastScanPosPass2 &&<br>AbsLevelPass2[ xC ][ yC ] >= 10 ) | |<br>    ( n > lastScanPosPass2 && n <=<br>lastScanPosPass1 &&<br>      AbsLevelPass1[ xC ][ yC ] >= 2 ) | |<br>    ( n > lastScanPosPass1 &&<br>sb_coded_flag[ xS ][ yS ] ) )<br>    abs_remainder[ n ]<br>  if( n <= lastScanPosPass2 )<br>    AbsLevel[ xC ][ yC ] =<br>AbsLevelPass2[ xC ][ yC ] + 2 * abs_remainder[ n ]<br>  else if(n <= lastScanPosPass1 )<br>    AbsLevel[ xC ][ yC ] =<br>AbsLevelPass1[ xC ][ yC ] + 2 * abs_remainder[ n ]<br>  else { /* bypass */<br>    AbsLevel[ xC ][ yC ] = abs_remainder[ n ]<br>    if( abs_remainder[ n ] ) | ae(v) |

-continued

| | Descriptor |
|---|---|
|     coeff_sign_flag[ n ]<br>  }<br>  if( BdpcmFlag[ x0 ][ y0 ][ cIdx ] = = 0 &&<br>n <= lastScanPosPass1 ) {<br>    absLeftCoeff = xC > 0 ?<br>AbsLevel[ xC − 1 ][ yC ] ) : 0<br>    absAboveCoeff = yC > 0 ?<br>AbsLevel[ xC ][ yC − 1 ] ) : 0<br>    predCoeff = Max( absLeftCoeff,<br>absAboveCoeff )<br>    if( AbsLevel[ xC ][ yC ] = = 1 &&<br>predCoeff > 0 )<br>      AbsLevel[ xC ][ yC ] = predCoeff<br>    else if( AbsLevel[ xC ][ yC ] > 0 &&<br>AbsLevel[ xC ][ yC ] <= predCoeff )<br>      AbsLevel[ xC ][ yC ]− −<br>  }<br>  TransCoeffLevel[ x0 ][ y0 ][ cIdx ][ xC ]<br>[ yC ] = ( 1 − 2 * coeff_sign_flag[ n ] ) *<br>    AbsLevel[ xC ][ yC ]<br>  }<br>} | ae(v) |

3.2.1 Context Modeling and Context Index Offset Derivation of Sign Flag coeff_sign_flag

TABLE 51

Association of ctxIdx and syntax elements for each initializationType in the initialization process

| Syntax | | | initType | | |
|---|---|---|---|---|---|
| structure | Syntax element | ctxTable | 0 | 1 | 2 |
| residual_coding( ) | last_sig_coeff_x_prefix | Table 119 | 0 . . . 22 | 23 . . . 45 | 46 . . . 68 |
| | last_sig_coeff_y_prefix | Table 120 | 0 . . . 22 | 23 . . . 45 | 46 . . . 68 |
| | sb_coded_flag[ ][ ] | Table 121 | 0 . . . 7 | 8 . . . 15 | 16 . . . 23 |
| | sig_coeff_flag[ ][ ] | Table 122 | 0 . . . 62 | 63 . . . 125 | 126 . . . 188 |
| | par_level_flag[ ] | Table 123 | 0 . . . 32 | 33 . . . 65 | 66 . . . 98 |
| | abs_level_gtx_flag[ ][ ] | Table 124 | 0 . . . 73 | 74 . . . 147 | 148 . . . 220 |
| | coeff_sign_flag[ ] | Table 125 | 0 . . . 5 | 6 . . . 11 | 12 . . . 17 |

TABLE 125

Specification of initValue and shiftIdx for ctxInc of coeff_sign_flag

| | ctxIdx of coeff_sign_flag | | | | | | | | | | | | | | | | |
|---|---|---|---|---|---|---|---|---|---|---|---|---|---|---|---|---|---|
| Initialization | 0 | 1 | 2 | 3 | 4 | 5 | 6 | 7 | 8 | 9 | 1 | 1 | 1 | 1 | 1 | 1 | 1 |
| initValu | EP | EP | EP | EP | EP | EP | EP | EP | EP | EP | EP | EP | EP | EP | EP | EP | EP |
| shiftIdx | 0 | 0 | 0 | 0 | 0 | 0 | 0 | 0 | 0 | 0 | 0 | 0 | 0 | 0 | 0 | 0 | 0 |

TABLE 131

Assignment of ctxInc to syntax elements with context coded bins

| | binIdx | | | | | |
|---|---|---|---|---|---|---|
| Syntax element | 0 | 1 | 2 | 3 | 4 | >=5 |
| coeff_sign_flag[ ]<br>transform_skip_flag[<br>x0 ][ y0 ][ cIdx ] = = 0<br>\|\| RemCcbs = = 0 \|\|<br>slice_ts_residual_coding_disabled_flag | bypass | na | na | na | na | na |

TABLE 131-continued

Assignment of ctxInc to syntax elements with context coded bins

| Syntax element | binIdx | | | | | |
|---|---|---|---|---|---|---|
| | 0 | 1 | 2 | 3 | 4 | >=5 |
| coeff_sign_flag[ ]<br>transform_skip_flag[<br>x0 ][ y0 ][ cIdx ] = = 1<br>&& RemCcbs >= 0<br>&& !slice_ts_residual_coding_disabled_flag | 0 . . . 5<br>(clause 9.3.4.2.10) | na | na | na | na | na |

9.3.4.2.10 Derivation Process of ctxInc for the Syntax Element coeff_sign_flag for Transform Skip Mode Inputs to this process are the colour component index cIdx, the luma location (x0, y0) specifying the top-left sample of the current transform block relative to the top-left sample of the current picture, the current coefficient scan location (xC, yC)

Output of this process is the variable ctxInc.

The variables leftSign and aboveSign are derived as follows:

leftSign=(xC==0)?0: CoeffSignLevel[xC−1][yC]    (1595)

aboveSign=(yC==0)?0: CoeffSignLevel[xC][yC−1]    (1596)

The variable ctxInc is derived as follows:

If leftSign is equal to 0 and aboveSign is equal to 0, or if leftSign is equal to −aboveSign, the following applies:

ctxInc=(BdpcmFlag[x0][y0][cIdx]==0?0:3)    (1597)

Otherwise, if leftSign is greater than or equal to 0 and aboveSign is greater than or equal to 0, the following applies:

ctxInc=(BdpcmFlag[x0][y0][cIdx]?1:4)    (1598)

Otherwise, the following applies:

ctxInc=(BdpcmFlag[x0][y0][cIdx]?2:5)    (1599)

3.3 Block-Based Quantized Residual Domain DPCM (BDPCM)

In JVET-M0413, a quantized residual BDPCM is proposed and adopted into VVC draft to code screen contents efficiently.

The prediction directions used in quantized residual (QR)-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block Differential Pulse Code Modulation (DPCM) is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $Q(r_{i,j}) = \Sigma_{k=0}^{i} \tilde{r}_{k,j}$, $0 \leq i \leq (M-1)$, $0 \leq j \leq (N-1)$.

For horizontal case, $Q(r_{i,j}) = \Sigma_{k=0}^{j} \tilde{r}_{i,k}$, $0 \leq i \leq (M-1)$, $0 \leq j \leq (N-1)$.

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

3.4 Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high-level syntax (HLS) aspects have been significantly simplified at the sacrifice of some flexibilities. For example, an intra random access point (IRAP) AU is required to contain a picture for each of the layers present in the Coded Video Sequence (CVS).

A VVC bitstream may consists of one or more output layer sets (OLSs). An OLS is a set of layers for which one or more layers are specified as the output layers. An output layer is a layer that is output after being decoded.

3.5 Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

In VVC, APS is used to carried parameters for ALF, LMCS, and scaling list parameters.

3.6 NAL Unit Types and NAL Unit Header Syntax and Semantics in VVC

In the latest VVC text (in JVET-Q2001-vE/v15), the NAL unit header syntax and semantics are as follows.

7.3.1.2 NAL Unit Header Syntax

|  | Descriptor |
|---|---|
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

7.4.2.2 NAL Unit Header Semantics forbidden_zero_bit shall be equal to 0.

nuh_reserved_zero_bit shall be equal to 0. The value 1 of nuh_reserved_zero_bit may be specified in the future by ITU-T|ISO/IEC. Decoders shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC.

The value of nuh_layer_id shall be the same for all VCL NAL units of a coded picture. The value of nuh_layer_id of a coded picture or a PU is the value of the nuh_layer_id of the VCL NAL units of the coded picture or the PU.

The value of nuh_layer_id for AUD, Picture Header (PH), End Of Sequence (EOS), and Filler Data (FD) NAL units is constrained as follows:

If nal_unit_type is equal to AUD_NUT, nuh_layer_id shall be equal to vps_layer_id[0].

Otherwise, when nal_unit_type is equal to PH_NUT, EOS_NUT, or FD_NUT, nuh_layer_id shall be equal to the nuh_layer_id of associated VCL NAL unit.

NOTE 1—The value of nuh_layer_id of Decoding Capability Information (DCI), VPS, and End of Bitstream (EOB) NAL units is not constrained.

The value of nal_unit_type shall be the same for all pictures of a CVS Start (CVSS) AU.

nal_unit_type specifies the NAL unit type, i.e., the type of Raw Byte Sequence Payload (RBSP) data structure contained in the NAL unit as specified in Table 5.

NAL units that have nal_unit_type in the range of UNSPEC_28 . . . UNSPEC_31, inclusive, for which semantics are not specified, shall not affect the decoding process specified in this Specification.

NOTE 2—NAL unit types in the range of UNSPEC_28 ... UNSPEC_31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the DUs of the bitstream (as specified in Annex C), decoders shall ignore (remove from the bitstream and discard) the contents of all NAL units that use reserved values of nal_unit_type.

NOTE 3—This requirement allows future definition of compatible extensions to this Specification.

TABLE 5

| | | NAL unit type codes and NAL unit type classes | |
|---|---|---|---|
| nal_unit_type | Name of nal_unit_type | Content of NAL unit and RBSP syntax structure | NAL unit type class |
| 0 | TRAIL_NUT | Coded slice of a trailing picture slice_layer_rbsp( ) | VCL |
| 1 | STSA_NUT | Coded slice of an Step-wise Temporal Sublayer Access (STSA) picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 ... 6 | RSV_VCL_4 ... RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

NOTE 4—A clean random access (CRA) picture may have associated RASL or Random Access Decodable Leading (RADL) pictures present in the bitstream.

NOTE 5—An instantaneous decoding refresh (IDR) picture having nal_unit_type equal to IDR_N_LP does not have associated leading pictures present in the bitstream. An IDR picture having nal_unit_type equal to IDR_W_RADL does not have associated Random Access Skipped Leading (RASL) pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

If mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (mixed_nalu_types_in_pic_flag is equal to 1), the picture shall have at least two subpictures and VCL NAL units of the picture shall have exactly two different nal_unit_type values as follows: the VCL NAL units of at least one subpicture of the picture shall all have a particular value of nal_unit_type equal to STSA_NUT, RADL_NUT, RASL_NUT, IDR_W_RADL, IDR_N_LP, or CRA_NUT, while the VCL NAL units of other subpictures in the picture shall all have a different particular value of nal_unit_type equal to TRAIL_NUT, RADL_NUT, or RASL_NUT.

For a single-layer bitstream, the following constraints apply:

Each picture, other than the first picture in the bitstream in decoding order, is considered to be associated with the previous IRAP picture in decoding order.

When a picture is a leading picture of an IRAP picture, it shall be a RADL or RASL picture.

When a picture is a trailing picture of an IRAP picture, it shall not be a RADL or RASL picture.

No RASL pictures shall be present in the bitstream that are associated with an IDR picture.

No RADL pictures shall be present in the bitstream that are associated with an IDR picture having nal_unit_type equal to IDR_N_LP.

NOTE 6—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.

Any picture that precedes an IRAP picture in decoding order shall precede the IRAP picture in output order and shall precede any RADL picture associated with the IRAP picture in output order.

Any RASL picture associated with a CRA picture shall precede any RADL picture associated with the CRA picture in output order.

Any RASL picture associated with a CRA picture shall follow, in output order, any IRAP picture that precedes the CRA picture in decoding order.

If field_seq_flag is equal to 0 and the current picture is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture preceding picA in decoding order, and there shall be no non-leading picture between picA and picB in decoding order.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalId = nuh\_temporal\_id\_plus1 - 1 \qquad (36)$$

When nal_unit_type is in the range of IDR_W_RADL to RSV_IRAP_12, inclusive, TemporalId shall be equal to 0.

When nal_unit_type is equal to STSA_NUT and vps_independent_layer_flag[GeneralLayerIdx[nuh_layer_id]] is equal to 1, TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DCI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE 7—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

3.7 Adaptive Loop Filter (ALF)

Figure 7:
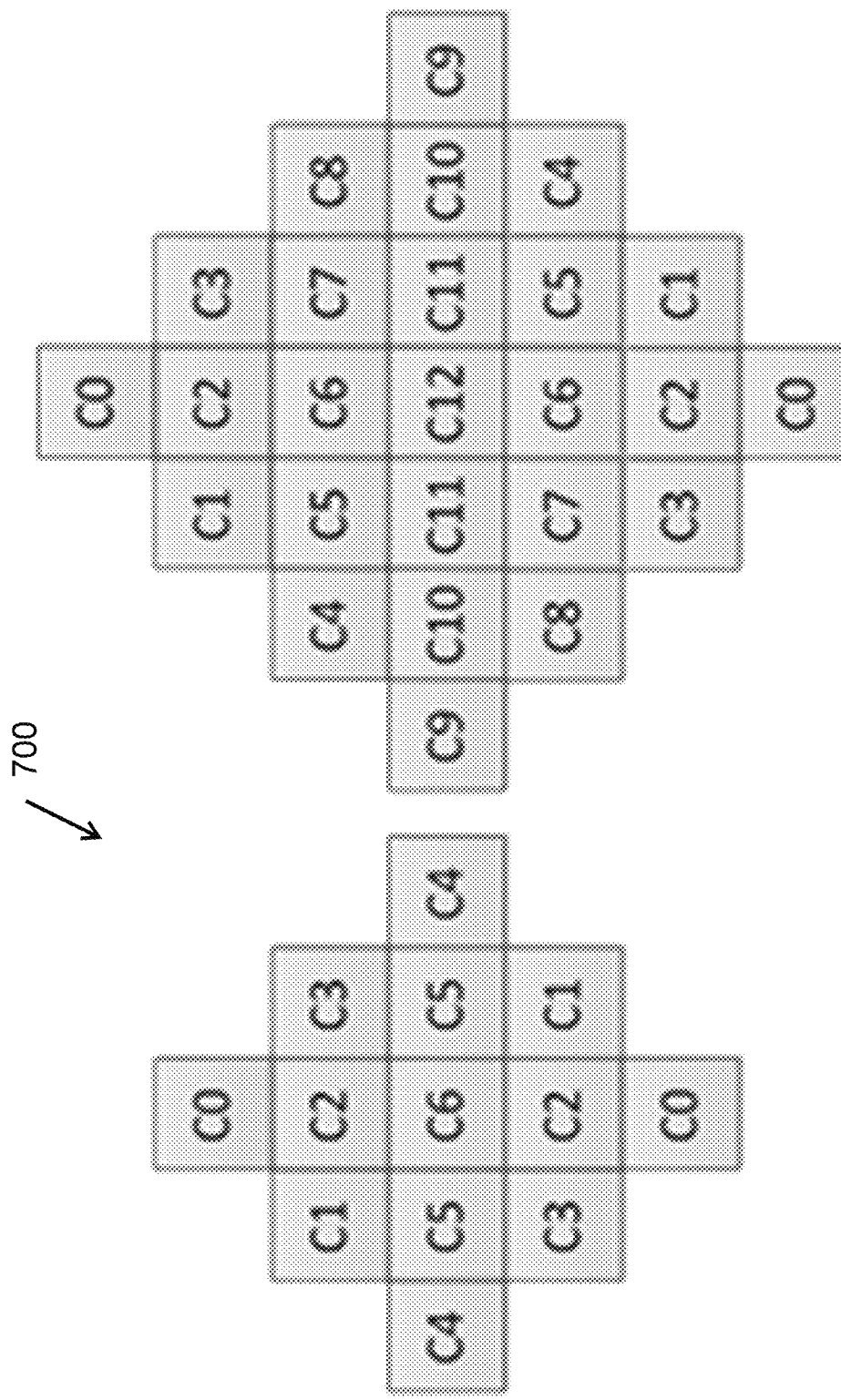
FIG. 7 shows examples of adaptive loop filter (ALF) filter shapes (chroma: 5×5 diamond, luma: 7×7 diamond).

Two diamond filter shapes 700 (as shown in FIG. 7) are used in block-based ALF. The 7×7 diamond shape is applied for luma component and the 5×5 diamond shape is applied for chroma components. One among up to 25 filters is selected for each 4×4 block, based on the direction and activity of local gradients. Each 4×4 block in the picture is classified based on directionality and activity. Before filtering each 4×4 block, simple geometric transformations such as rotation or diagonal and vertical flip can be applied to the filter coefficients depending on gradient values calculated for that block. This is equivalent to applying these transformations to the samples in the filter support region. The idea is to make different blocks to which ALF is applied more similar by aligning their directionality. Block-based classification is not applied to the chroma components.

ALF filter parameters are signaled in the adaptation parameter set (APS). In one APS, up to 25 sets of luma filter coefficients and clipping value indices, and up to eight sets of chroma filter coefficients and clipping value indices could be signaled. To reduce bits overhead, filter coefficients of different classification for luma component can be merged. In the picture or slice header, the IDs of up to 7 APSs can be signaled to specify the luma filter sets that are used for the current picture or slice. The filtering process is further controlled at CTB level. A luma CTB can choose a filter set among 16 fixed filter sets and the filter sets signaled in APSs. For the chroma components, an APS ID is signaled in picture or slice header to indicate the chroma filter sets being used for the current picture or slice. At Coding Tree Block (CTB) level, a filter index is signaled for each chroma CTB if there is more than one chroma filter set in the APS. When ALF is enabled for a CTB, for each sample within the CTB, the diamond shape filter with the signaled weights is performed, with a clipping operation applied to clap the difference between the neighbor sample and the current sample. The clipping operation introduces non-linearity to make ALF more efficient by reducing the impact of neighbor sample values that are too different with the current sample value.

Figure 8:
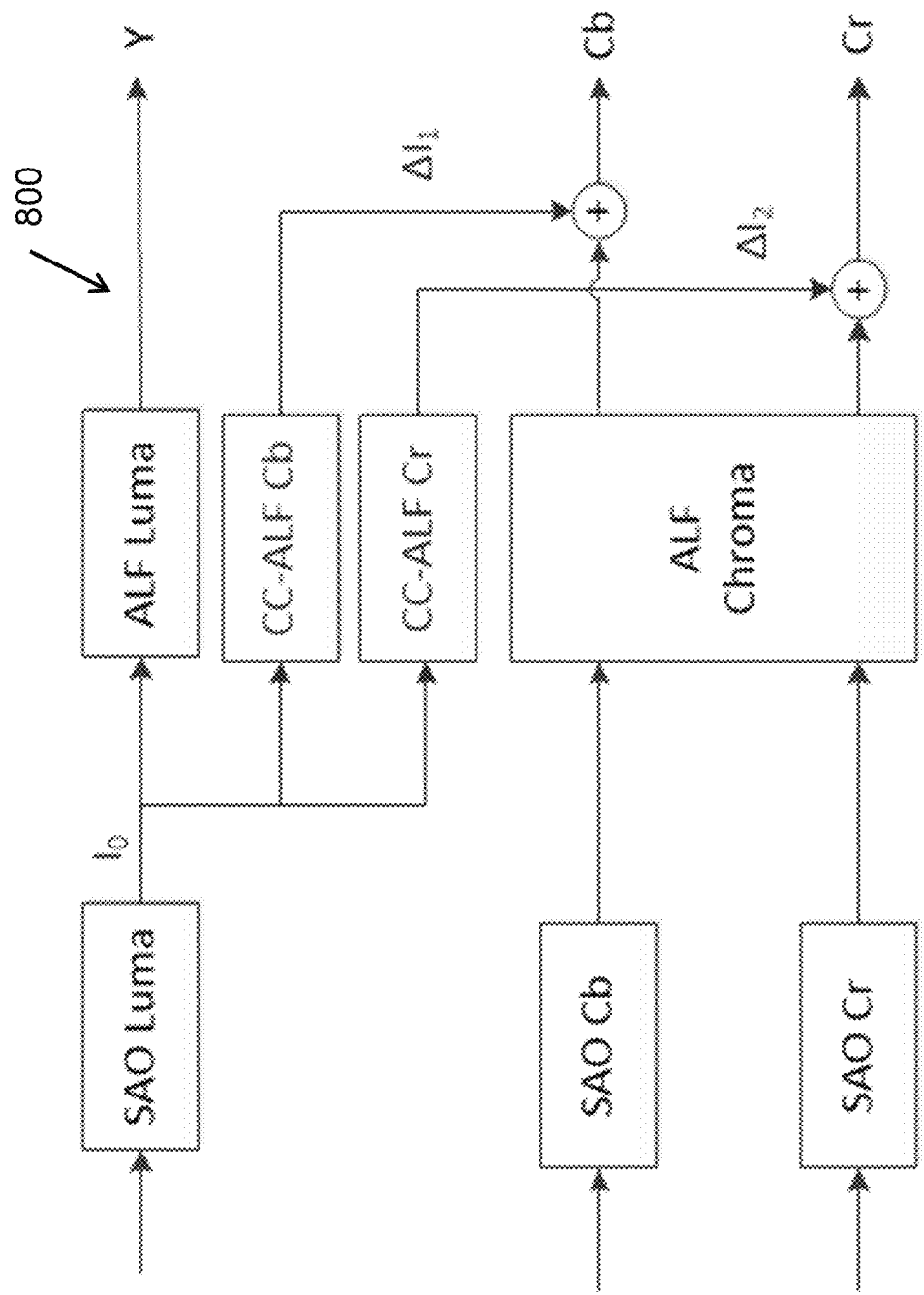
FIG. 8 shows examples of ALF and cross component (CC)-ALF diagram.

Cross-Component Adaptive Loop Filter (CC-ALF) can further enhance each chroma component on top of the previously described ALF. The goal of CC-ALF is to use luma sample values to refine each chroma component. This is achieved by applying an applying a diamond-shaped high-pass linear filter and then using the output of this filtering operation for the chroma refinement. FIG. 8 provides a system level diagram 800 of the CC-ALF process with respect to the other loop filters. As shown in FIG. 8, the CC-ALF using the same inputs as the luma ALF to avoid additional step of the whole loop-filter process.

3.8 Luma Mapping With Chroma Scaling (LMCS)

Unlike other in-loop filters (i.e., deblocking, Sample Adaptive Offset (SAO), and ALF), which in general apply filtering processes for a current sample by using the information of its spatial neighboring samples to reduce the coding artifacts, the luma mapping with chroma scaling (LMCS) modifies the input signal before encoding by redistributing the codewords across the entire dynamic range to improve compression efficiency. LMCS has two main components: (a) in-loop mapping of the luma component based on adaptive piecewise linear models, and (b), luma-dependent chroma residual scaling for the chroma components. Luma mapping makes use of a forward mapping function, FwdMap, and a corresponding inverse mapping function, InvMap. The FwdMap function is signaled using a piecewise linear model with 16 equal pieces. InvMap function does not need to be signaled and is instead derived from the FwdMap function. The luma mapping model is signaled in the APS. Up to 4 LMCS APSs can be used in a coded video sequence. When LMCS is enabled for a picture, an APS ID is signaled in the picture header to identify the APS that carries the luma mapping parameters. When LMCS is enabled for a slice, the InvMap function is applied to all the reconstructed luma blocks to convert the samples back to the original domain. For an inter coded block, an additional mapping process is needed, which is applying the FwdMap function to map the luma prediction block in the original domain to the mapped domain after the normal compensation process. Chroma residual scaling is designed to compensate for the interaction between the luma signal and its corresponding chroma signals. When luma mapping is enabled, an additional flag is signaled to indicate whether luma-dependent chroma residual scaling is enabled or not. The chroma residual scaling factor depends on the average value of top and/or left reconstructed neighboring luma samples of the current CU. Once the scaling factor is determined, the forward scaling is applied to both the intra and inter predicted residual at the encoding stage, and the inverse scaling is applied to the reconstructed residual.

4 Examples of Technical Problems Solved by Disclosed Technical Solutions

The existing design in the latest VVC text (in JVET-Q2001-vE/v15) has the following problems:
1) Although the coefficient coding in JVET-N0280 can achieve coding benefits on screen content coding, the coefficients coding and TS mode may still have some drawbacks.
   a) For example, the contexts used for coding sign flags (as described in Section 3.2.1) may be non-consecutive when BDPCM is disabled for a sequence. Such a design will result in difficulty in context switching since the memory address associated with non-consecutive context indices will also be non-consecutive.
   b) Whether to use bypass coding or context coding for the sign flags is unclear for the case:
      The number of remaining allowed context coded bins (denoted by RemCcbs) is equal to 0.
      The current block is coded with TS mode.
      slice_ts_residual_coding_disabled_flag is false.
2) The repetition of majority of the SEI messages is limited to be at most 4 times within a PU, and repetition of the decoding unit info SEI message is limited to be at most 4 times within a DU. However, it is still possible to repeat the same SEI message multiple times between two VCL NAL units, which is meaningless.
3) The repetition of non-VCL NAL units other than SEI NAL units between two VCL NAL units is allowed, which is, however, also meaningless.
4) An APS NAL unit can be shared across layers. However, for ALF, the filters are quite dependent on the reconstructed samples, while for different layers, even with the same video content, the QPs may be used differently, and therefore the inheritance of ALF filters from that generated for a picture of a different layer in most cases would not give any negligible coding gain benefit. Therefore, sharing of an APS NAL unit across layers should be disallowed to make the ALF APS operations simpler. Similarly for other types of APSs (i.e., LMCS APSs and scaling list APSs).
5) The following constraint exists:
   All APS NAL units with a particular value of adaptation_parameter_set_id and a particular value of aps_params_type within a PU, regardless of whether they are prefix or suffix APS NAL units, shall have the same content.

The constraint disallows the update of the content of an APS NAL unit within a PU. However, when a picture is split into multiple slices, it makes sense to allow the encoder to individually figure out the ALF parameters to be for the slices. When the number of slice is large, e.g., in 360° video applications, an update to an ALF APS NAL unit (i.e., change the values of the syntax elements of an APS NAL unit other than the NAL unit type, APS ID, and APS type fields) may be needed.

6) It is specified that all APS NAL units with a particular value of aps_params_type, regardless of the nuh_layer_id values, share the same value space for adaptation_parameter_set_id. However, on the other hand, it is specified that all APS NAL units with a particular value of adaptation_parameter_set_id and a particular value of aps_params_type within a PU, regardless of whether they are prefix or suffix APS NAL units, shall have the same content. Therefore, it makes sense for APSs of the same type with different NAL unit types to also share the same value space for adaptation_parameter_set_id.

7) It is allowed for an APS NAL unit (with a particular value of nal_unit_type, a particular value of adaptation_parameter_set_id, and a particular value of aps_params_type) to be shared across PUs and even across Coded Layer Video Sequence (CLVSs). However, it is not expected to have good coding gain to allow sharing a particular APS NAL unit across CLVSs.

5 A Listing of Technical Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

Solutions for Addressing Problem 1

Let BdpcmFlag be the current BDPCM flag, leftSign be the sign of the left neighboring coefficient and aboveSign be the sign of the above neighboring coefficient.

Let the condition M be leftSign is equal to 0 and aboveSign is equal to 0, or leftSign is equal to −aboveSign.

1. It is proposed that the allowed context index offset for coding sign flags may be within a first range [N0, N1] if the current block is coded with a mode X, and [N2, N3] otherwise.
    a. In one example, the mode X may be the luma and/or chroma BDPCM mode.
    b. In one example, N0, N1, N2 and N3 may be 0, 2, 3 and 5, respectively.
    c. In one example, the above examples may be applied when the condition M is false.
    d. In one example, the above examples may be applied when transform skip is applied on a block.
    e. The N0, N1, N2 and N3 may be determined based on one or more of the following:
        i. An indication signaled in the SPS/VPS/PPS/picture header/slice header/tile group header/Largest Coding Unit (LCU) row/group of LCUs/LCU/CU.
        ii. The block dimensions of the current block and/or its neighboring blocks.
        iii. The block shapes of the current block and/or its neighboring blocks.
        iv. An indication of the color format (such as 4:2:0, 4:4:4).
        v. Whether the separate or dual coding tree structure is in use.
        vi. Slice type and/or picture type.
        vii. The number of color components.

2. It is proposed that sign flags are coded with bypass mode when the number of remaining allowed context coded bins (denoted by RemCcbs) is smaller than N.
    a. In one example, the sign flags are coded with bypass mode when RemCcbs<N.
        i. Alternatively, in one example, the sign flags are coded with context mode when RemCcbs>=N.
    b. In one example, the sign flags are coded with bypass mode when RemCcbs is equal to N.
        i. Alternatively, in one example, the sign flags are coded with bypass mode when RemCcbs>N.
    c. In one example, N may be set equal to 4.
        i. Alternatively, in one example, N may be set equal to 0.
    d. In one example, N is an integer number and may be based on:
        i. An indication signaled in the SPS/VPS/PPS/picture header/slice header/tile group header/LCU row/group of LCUs/LCU/CU.
        ii. The block dimensions of the current block and/or its neighboring blocks.
        iii. The block shapes of the current block and/or its neighboring blocks.
        iv. An indication of the color format (such as 4:2:0, 4:4:4).
        v. Whether the separate or dual coding tree structure is in use.
        vi. Slice type and/or picture type.
        vii. The number of color components.
    e. The above examples may be applied on transform blocks and/or transform skip blocks including or excluding BDPCM coded blocks.

3. The context index offset for coding sign flags may be determined based on one or more of the following:
    a. An indication signaled in the SPS/VPS/PPS/picture header/slice header/tile group header/LCU row/group of LCUs/LCU/CU.
    b. The block dimensions of current block and/or its neighboring blocks.
    c. The block shapes of the current block and/or its neighboring blocks.
        i. In one example, the context values of sign flags may be separate for different block shapes.
    d. The prediction modes (Intra/Inter) of the neighboring blocks of the current block
        i. In one example, the context values of sign flags may be separate for intra and inter blocks.
    e. The indications of the BDPCM modes of the neighboring blocks of the current block.
    f. An indication of the color format (such as 4:2:0, 4:4:4).
    g. Whether the separate or dual coding tree structure is in use.
    h. Slice type and/or picture type.
    i. The number of color components.
        i. In one example, the context values of sign flags may be separate for luma and chroma color components.

Solutions for Addressing Problems 2 to 5:

The term "slice unit" is defined, as follows:

slice unit (SU): A set of NAL units that are consecutive in decoding order and contain exactly one coded slice and all its associated non-VCL NAL units.

4. To solve problem 2, one or more of all types of SEI messages may be disallowed to be repeated within an SU.
   a. In one example, any SEI message of a particular payloadType value with a particular content is disallowed to be repeated within an SU, and the constraint is specified as follows: The number of identical sei_payload( ) syntax structures with any particular value of payloadType within an SU shall not be greater than 1.
   b. Alternatively, any SEI message of a particular payloadType value (regardless of the content) is disallowed to be repeated within an SU.
      i. In one example, the constraint is specified as follows: The number of sei_payload( ) syntax structures with any particular value of payloadType within an SU shall not be greater than 1.
   c. Alternatively, any SEI message with a particular payloadType is disallowed to be updated within an SU.
      i. In one example, the constraint is specified as follows: All sei_payload( ) syntax structures with a particular value of payloadType within an SU shall have the same content.
5. To solve problem 3, the repetition of a non-VCL NAL unit within an SU may be disallowed for one or more of the non-VCL NAL types other than PREFIX_SEI_NUT and SUFFIX_SEI_NUT.
   a. In one example, one or more of the following constrains are specified:
      i. In one example, a constraint is specified as follows: The number of DCI NAL units within an SU shall not be greater than 1.
      ii. In one example, a constraint is specified as follows: The number of VPS NAL units with a particular value of vps_video_parameter_set_id within an SU shall not be greater than 1.
      iii. In one example, a constraint is specified as follows: The number of SPS NAL units with a particular value of sps_seq_parameter_set_id within an SU shall not be greater than 1.
      iv. In one example, a constraint is specified as follows: The number of PPS NAL units with a particular value of pps_pic_parameter_set_id within an SU shall not be greater than 1.
      v. In one example, a constraint is specified as follows: The number of APS NAL units with a particular value of adaptation_parameter_set_id and a particular value of aps_params_type within an SU shall not be greater than 1.
      vi. In one example, a constraint is specified as follows: The number of APS NAL units with a particular value of nal_unit_type, a particular value of adaptation_parameter_set id, and a particular value of aps_params_type within an SU shall not be greater than 1.
   b. Alternatively or additionally, DCI NAL units are disallowed to be repeated within a CLVS or CVS.
   c. Alternatively or additionally, VPS NAL units with a particular value of vps_video_parameter_set_id are disallowed to be repeated within a CLVS or CVS.
   d. Alternatively or additionally, SPS NAL units with a particular value of sps_seq_parameter_set_id are disallowed to be repeated within a CLVS.
6. To solve problem 4, it may be specified that all types of APSs shall not be shared across layers.
   a. Alternatively, it may be specified that ALF APSs shall not be shared across layers.
7. To solve problem 5, it may be specified that ALF APSs may be updated within a PU.
   a. Alternatively, it may be specified that no adaptation parameter set is allowed to be updated within the picture unit.
8. To solve problem 6, it may be specified that all APS NAL units with a particular value of aps_params_type, regardless of the nuh_layer_id values and whether they are prefix or suffix APS NAL units, share the same value space for adaptation_parameter_set_id.
   a. Alternatively, it may be specified that LMCS APS NAL units, regardless of the nuh_layer_id values and whether they are prefix or suffix APS NAL units, share the same value space for adaptation_parameter_set_id.
   b. Alternatively, it may be specified that ALF APS NAL units, regardless of the nuh_layer_id values and whether they are prefix or suffix APS NAL units, share the same value space for adaptation_parameter_set_id.
9. To solve problem 6, it may be specified that an APS NAL unit (with a particular value of nal_unit_type, a particular value of adaptation_parameter_set_id, and a particular value of aps_params_type) shall not be shared across CLVSs.
   a. In one example, it is specified that an APS NAL unit referred to by a VCL NAL unit vclNalUnitA shall not be an associated non-VCL NAL unit of a VCL NAL unit in a different CLVS than the CLVS containing vclNalUnitA.
   b. Alternatively, it is specified that an APS NAL unit referred to by a VCL NAL unit vclNalUnitA shall not be an associated non-VCL NAL unit of a VCL NAL unit associated with different IRAP picture than the IRAP picture with which vclNalUnitA is associated.
   c. Alternatively, it is specified that an APS NAL unit referred to by a VCL NAL unit vclNalUnitA shall not be an associated non-VCL NAL unit of a VCL NAL unit associated with different IRAP or Gradual Decoding Refresh (GDR) picture than the IRAP or GDR picture with which vclNalUnitA is associated.
   d. Alternatively, it may be specified that APSs shall not be shared across CVSs.
      i. Alternatively, it may be specified that APSs with a particular APS type (e.g., ALF, LMCS, SCALING) shall not be shared across CVSs.

6 Embodiment

The embodiments are based on JVET-Q2001-vE. The deleted texts are marked by open and close double brackets (e.g., [[ ]]) with deleted text in between the double brackets. And the added texts are marked by boldface italics.

6.1 Embodiment #1

Derivation Process of ctxInc for the Syntax Element Coeff sign_flag for Transform Skip Mode Inputs to this process are the colour component index cIdx, the luma location (x0, y0) specifying the top-left sample of the current transform block relative to the top-left sample of the current picture, the current coefficient scan location (xC, yC)

Output of this process is the variable ctxInc.

The variables leftSign and aboveSign are derived as follows:

leftSign=(xC==0)?0: CoeffSignLevel[xC−1][yC]  (1595)

aboveSign=(yC==0)?0: CoeffSignLevel[xC][yC−1]  (1596)

The variable ctxInc is derived as follows:

If leftSign is equal to 0 and aboveSign is equal to 0, or if leftSign is equal to −aboveSign, the following applies:

ctxInc=(BdpcmFlag[x0][y0][cIdx]==0?0:3)  (1597)

Otherwise, if leftSign is greater than or equal to 0 and aboveSign is greater than or equal to 0, the following applies:

ctxInc=(BdpcmFlag[x0][y0][cIdx]==0?1:4)  (1598)

Otherwise, the following applies:

ctxInc=(BdpcmFlag[x0][y0][cIdx]==0?2:5)  (1599)

6.2 Embodiment #2

Derivation Process of ctxInc for the Syntax Element coeff_sign_flag for Transform Skip Mode Inputs to this process are the colour component index cIdx, the luma location (x0, y0) specifying the top-left sample of the current transform block relative to the top-left sample of the current picture, the current coefficient scan location (xC, yC)

Output of this process is the variable ctxInc.

The variables leftSign and aboveSign are derived as follows:

leftSign=(xC==0)?0: CoeffSignLevel[xC−1][yC]  (1595)

aboveSign=(yC==0)?0: CoeffSignLevel[xC][yC−1]  (1596)

The variable ctxInc is derived as follows:

If leftSign is equal to 0 and aboveSign is equal to 0, or if leftSign is equal to −aboveSign, the following applies:

ctxInc=[[(BdpcmFlag[x0][y0][cIdx]==0?]]0[[:3)]]  (1597)

Otherwise, if leftSign is greater than or equal to 0 and aboveSign is greater than or equal to 0, the following applies:

ctxInc=[[(BdpcmFlag[x0][y0][cIdx]?]]1[[:4)]]  (1598)

Otherwise, the following applies:

ctxInc=[[(BdpcmFlag[x0][y0][cIdx]?]]2[[:5)]]  (1599)

If the BdpcmFlag[x0][y0][cIdx] is equal to 1, the following applies:

ctxInc=ctxInc+3

6.3 Embodiment #3 sb_coded_flag[ xS][yS] specifies the following for the subblock at location (xS, yS) within the current transform block, where a subblock is an array of transform coefficient levels:

If sb_coded_flag[xS][yS] is equal to 0, the 16 transform coefficient levels of the subblock at location (xS, yS) are inferred to be equal to 0.

Otherwise (sb_coded_flag[xS][yS] is equal to 1), the following applies:

If (xS, yS) is equal to (0, 0) and (LastSignificantCoeffX, LastSignificantCoeffY) is not equal to (0, 0), at least one of the [[16]] numSbCoeff sig_coeff_flag syntax elements is present for the subblock at location (xS, yS).

Otherwise, at least one of the [[16]] numSbCoeff transform coefficient levels of the subblock at location (xS, yS) has a non-zero value.

When sb_coded_flag[xS][yS] is not present, it is inferred to be equal to 1.

6.4 Embodiment #4

This embodiment is for items 5 to 7.
7.4.3.5 Adaptation Parameter Set Semantics

Each APS RBSP shall be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type equal to LMCS_APS or SCALING_APS within a PU, regardless of whether they are prefix or suffix APS NAL units, shall have the same content.

adaptation_parameter_set_id provides an identifier for the APS for reference by other syntax elements.

When aps_params_type is equal to ALF_APS or SCALING_APS, the value of adaptation_parameter_set_id shall be in the range of 0 to 7, inclusive.

When aps_params_type is equal to LMCS_APS, the value of adaptation_parameter_set_id shall be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit shall not refer to the particular APS NAL unit unless apsLayerId is [[less than or]] equal to vclLayerId [[and the layer with nuh_layer_id equal to apsLayerId is included in at least one OLS that includes the layer with nuh_layer_id equal to vclLayerId]].

aps_params_type specifies the type of APS parameters carried in the APS as specified in Table 6.

TABLE 6

| 1. APS parameters type codes and types of APS parameters | | |
| --- | --- | --- |
| aps_params_type | Name of aps_params_type | Type of APS parameters |
| 0 | ALF_APS | ALF parameters |
| 1 | LMCS_APS | LMCS parameters |
| 2 | SCALING_APS | Scaling list parameters |
| 3 . . . 7 | Reserved | Reserved |

All APS NAL units with a particular value of aps_params_type, regardless of the nuh_layer_id values and whether they are prefix or suffix APS NAL units, share the same value space for adaptation_parameter_set_id. APS NAL units with different values of aps_params_type use separate values spaces for adaptation_parameter_set_id.

NOTE 1—An APS NAL unit (with a particular value of nal_unit_type, a particular value of adaptation_parameter_set_id, and a particular value of aps_params_type) can be shared across pictures, and different slices within a picture can refer to different ALF APSs.

NOTE 2—A suffix APS NAL unit associated with a particular VCL NAL unit (this VCL NAL unit precedes the suffix APS NAL unit in decoding order) is not for use by the particular VCL NAL unit, but for use by VCL NAL units following the suffix APS NAL unit in decoding order.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

6.5 Embodiments for Coding Sign Flag

In one embodiment, when the RemCcbs is less than 0, bypass coding is used.

TABLE 131

| Assignment of ctxInc to syntax elements with context coded bins | | | | | | |
|---|---|---|---|---|---|---|
| | binIdx | | | | | |
| Syntax element | 0 | 1 | 2 | 3 | 4 | >=5 |
| coeff_sign_flag[ ] transform_skip_flag[ x0 ][ y0 ][ cIdx ] = = 0 \|\| RemCcbs < 0 [[= = 0]] \|\| slice_ts_residual_coding_disabled_flag | bypass | na | na | na | na | na |
| coeff_sign_flag[ ] transform_skip_flag[ x0 ][ y0 ][ cIdx ] = = 1 && RemCcbs >= 0 && !slice_ts_residual_coding_disabled_flag | 0 . . . 5 (clause 9.3.4.2.10) | na | na | na | na | na |

Alternatively, in one embodiment, when current block is coded with transform skip mode and RemCcbs is greater than 0 and ?slice_ts_residual_coding_disabled_flag, context coding is used.

TABLE 131

| Assignment of ctxInc to syntax elements with context coded bins | | | | | | |
|---|---|---|---|---|---|---|
| | binIdx | | | | | |
| Syntax element | 0 | 1 | 2 | 3 | 4 | >=5 |
| coeff_sign_flag[ ] transform_skip_flag[ x0 ][ y0 ][ cIdx ] = = 0 \|\| RemCcbs < 0 [[= = 0]] \|\| slice_ts_residual_coding_disabled_flag | bypass | na | na | na | na | na |
| coeff_sign_flag[ ] transform_skip_flag[ x0 ][ y0 ][ cIdx ] = = 1 && RemCcbs >= 0 && !slice_ts_residual_coding_disabled_flag | 0 . . . 5 (clause 9.3.4.2.10) | na | na | na | na | na |

Alternatively, in one embodiment, when the RemCcbs is less than 4, bypass coding is used.

TABLE 131

| Assignment of ctxInc to syntax elements with context coded bins | | | | | | |
|---|---|---|---|---|---|---|
| | binIdx | | | | | |
| Syntax element | 0 | 1 | 2 | 3 | 4 | >=5 |
| coeff_sign_flag[ ] transform_skip_flag[ x0 ][ y0 ][ cIdx ] = = 0 \|\| RemCcbs < 0 [[= = 0]] \|\| slice_ts_residual_coding_disabled_flag | bypass | na | na | na | na | na |

TABLE 131-continued

Assignment of ctxInc to syntax elements with context coded bins

| Syntax element | binIdx | | | | | |
|---|---|---|---|---|---|---|
| | 0 | 1 | 2 | 3 | 4 | >=5 |
| coeff_sign_flag[ ]<br>transform_skip_flag[<br>x0 ][ y0 ][ cIdx ] = = 1<br>&& RemCcbs >= 0<br>&& !slice_ts_residual_coding_disabled_flag | 0 . . . 5<br>(clause 9.3.4.2.10) | na | na | na | na | na |

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
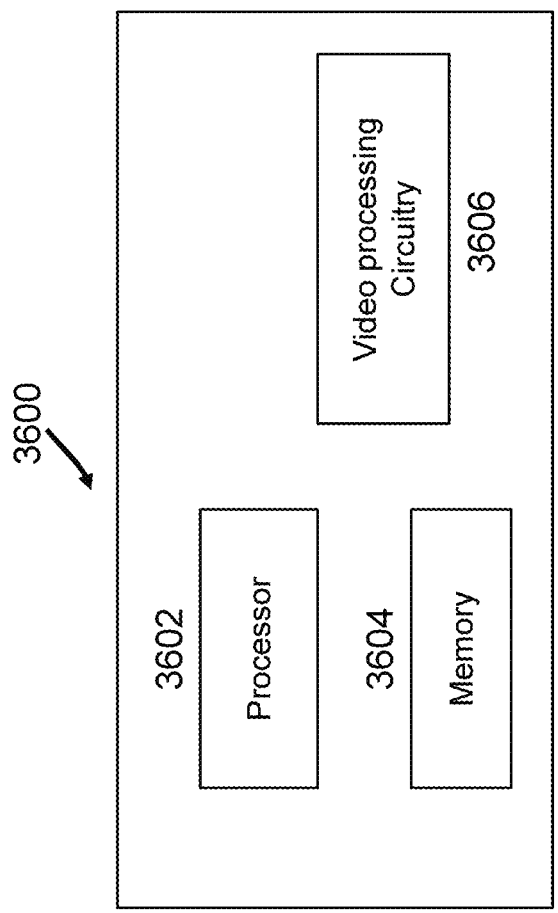
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
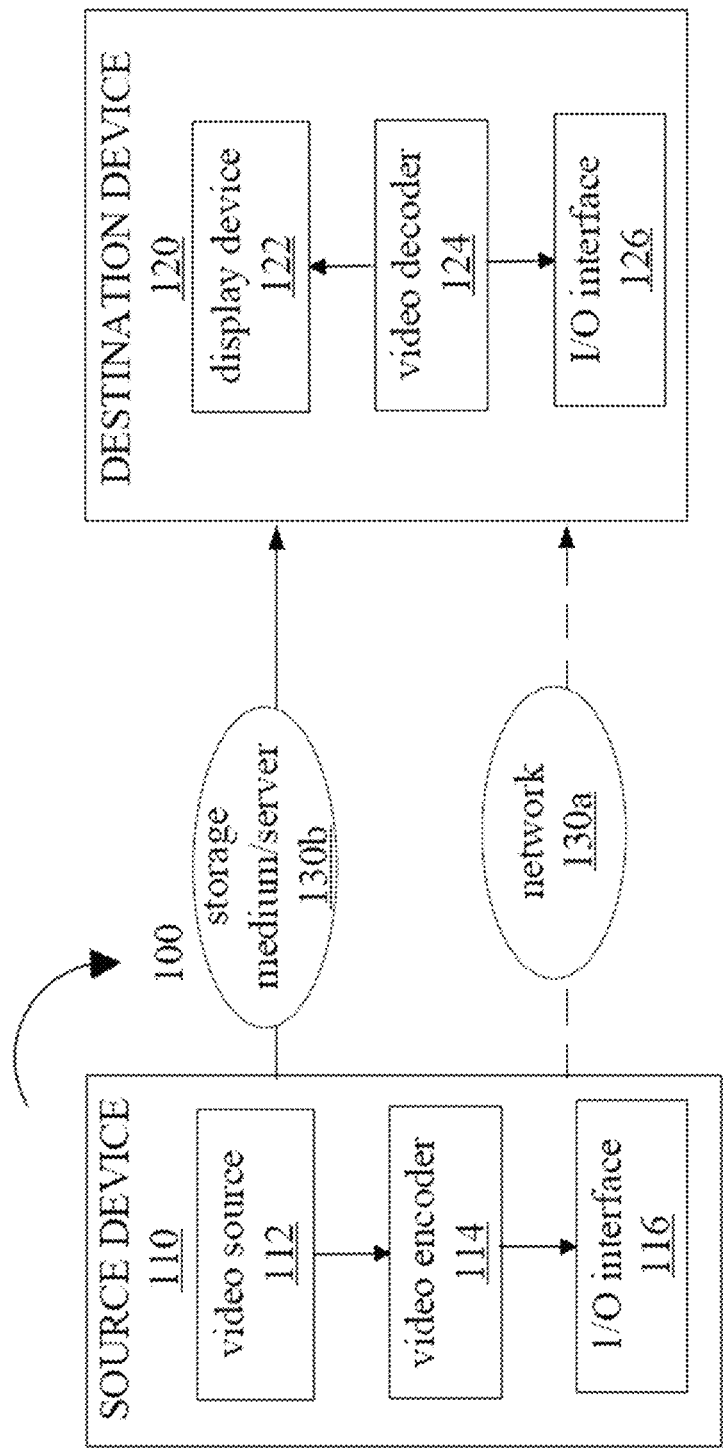
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
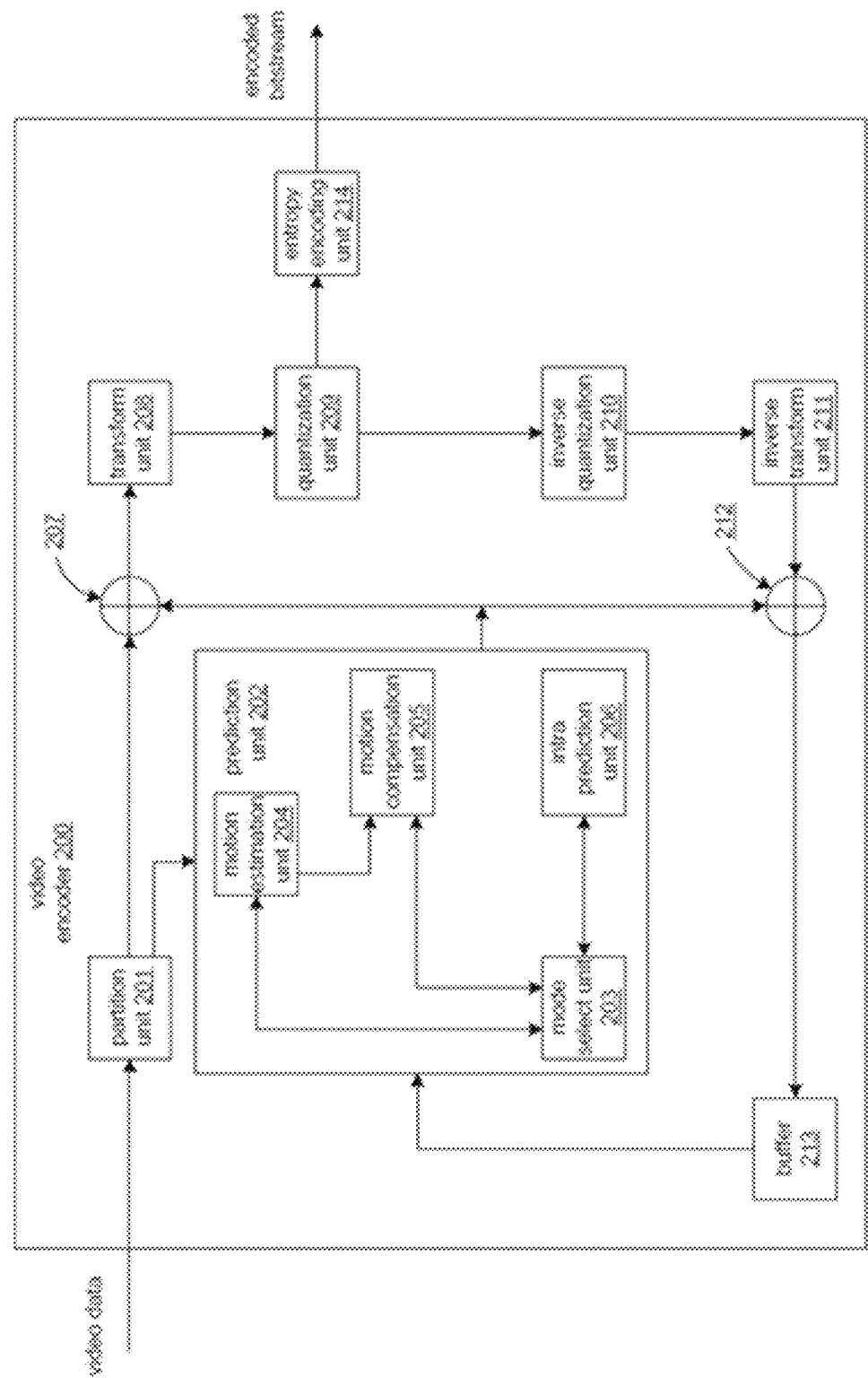
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 6:
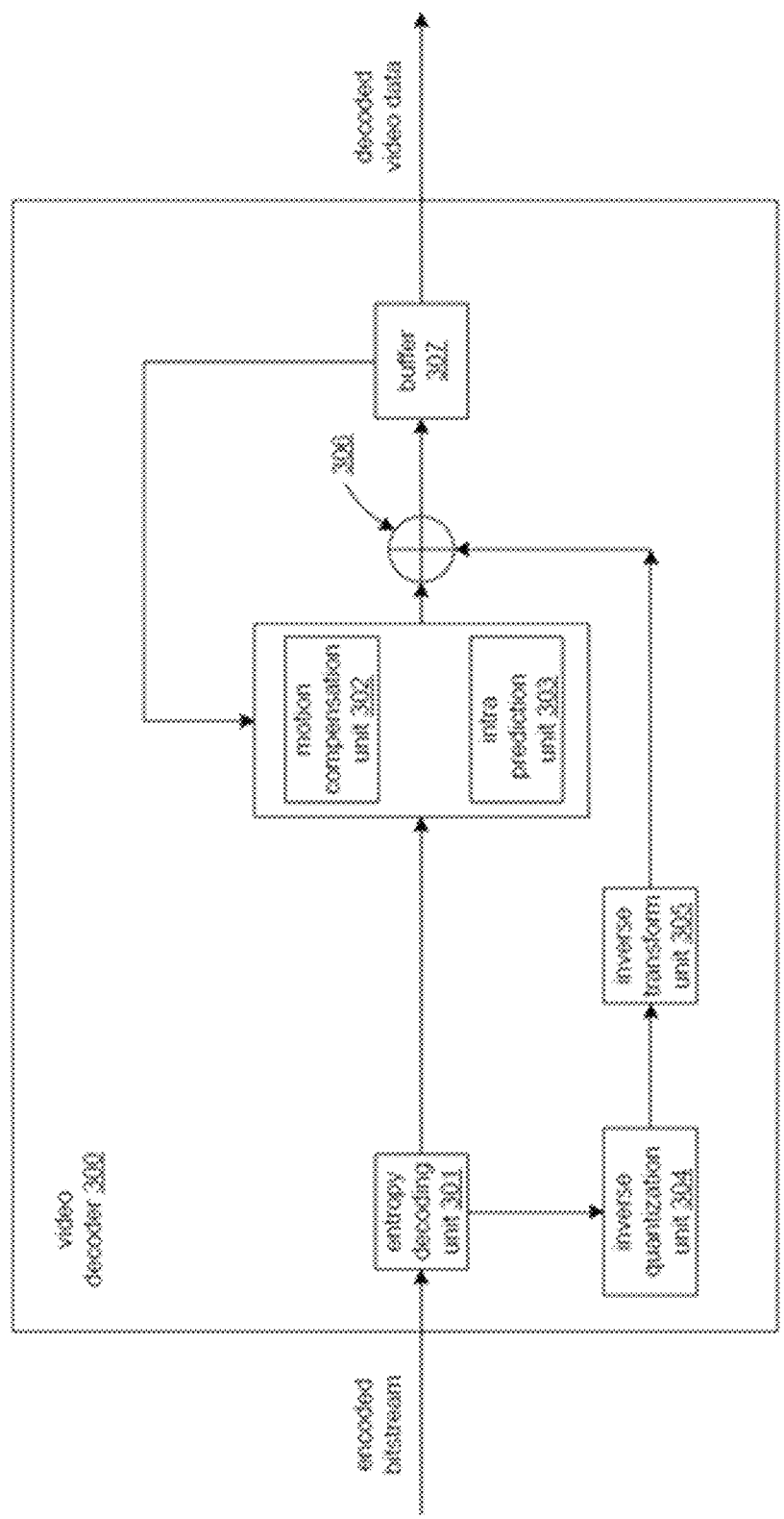
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 3:
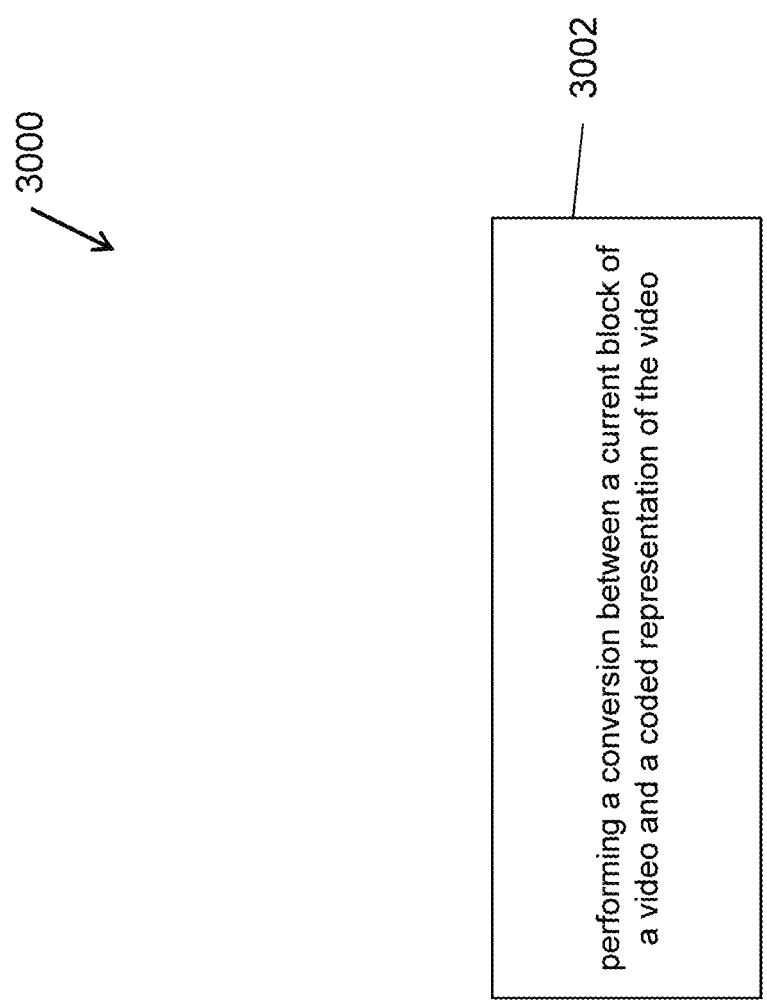
FIG. 3 is a flowchart for an example method of video processing.

1. A video processing method (e.g., method 3000 shown in FIG. 3), comprising performing (3002) a conversion between a current block of a video and a coded representation of the video; wherein the coded representation conforms to a format rule that specifies that a context index offset used for coding sign flags of the current block in the coded representation are in a range, wherein the range function of a coding mode used to represent the current block in the coded representation.

2. The method of solution 1, wherein the rule specifies that the range is [N0, N1] in case that the coding mode is a particular mode and [N2, N3] otherwise.

3. The method of solution 2, wherein the particular mode is a chroma or a luma block differential pulse coded modulation mode.

The following solutions show example embodiments of techniques discussed in the previous section (e.g., item 2).

4. A video processing method, comprising: performing a conversion between a current block of a video and a coded representation of the video; wherein the coded representation conforms to a format rule that specifies that sign flags of the current block are coded in the coded representation using one of context coded bins or bypass mode depending on a number of remaining context coded bins.

5. The method of solution 4, wherein the bypass mode is used for coding if and only if the number of remaining context coded bins is smaller than N, where N is a positive integer.

6. The method of solution 5, wherein the bypass mode is used for coding if and only if the number of remaining context coded bins is equal to N, where N is a positive integer.

The following solutions show example embodiments of techniques discussed in the previous section (e.g., item 2).

7. A video processing method, comprising: performing a conversion between a current block of a video and a coded representation of the video; wherein the conversion uses a block-based delta pulse code modulation (BDPCM) mode, wherein the coded representation conforms to a format rule that specifies that sign flags from the BDPCM are context coded in the coded representation such that a context index offset for coding the sign flags is a function of a coding condition of the current block.

8. The method of solution 7, wherein the coding condition corresponds to a syntax element included in the coded representation in sequence parameter set or a video parameter set or a picture parameter set or a picture header or a slice header or a tile group header or a logical coding unit level or a group of LCUs or a coding unit level.

9. The method of solution 7, wherein the coding condition corresponds to a block dimension of the current block and/or a neighboring block.

The following solutions show example embodiments of techniques discussed in the previous section (e.g., item 4).

10. A video processing method, comprising: performing a conversion between a current block of a video and a coded representation of the video; wherein the coded representation conforms to a format rule that specifies that a slice unit in the coded representation, corresponding to a set of network abstraction layer units that are in a consecutive decoding order and contain a single coded slice is allowed to include at least a portion of supplementary enhancement information (SEI) at most once.

11. The method of solution 10, wherein the portion of SEI corresponds to entire SEI.

12. The method of solution 10, wherein the portion of SEI corresponds to a particular type of SEI information field.

The following solutions show example embodiments of techniques discussed in the previous section (e.g., item 5).

13. A video processing method, comprising: performing a conversion between a current block of a video and a coded representation of the video; wherein the coded representation conforms to a format rule that specifies that a slice unit in the coded representation, corresponding to a set of network abstraction layer units that are in a consecutive decoding order and contain a single coded slice, includes one or more video coding layer network abstraction layer (VCL NAL) units, wherein the format rule further specifies a first type of units that are allowed to be repeated and a second type of units that are disallowed to be repeated in the slice unit.

14. The method of solution 13, wherein the second type of units comprise units having types in a range.

The following solutions show example embodiments of techniques discussed in the previous section (e.g., items 6, 7).

15. A video processing method, comprising: performing a conversion between a video comprising one or more video layers and a coded representation of the video according to a rule; wherein the coded representation comprises one or more adaptation parameter sets (APS); and wherein the rule specifies applicability of some of the one or more APS to the conversion of the one or more video layers.

16. The method of solution 15, wherein the rule specifies that all of the one or more APS are disabled from being shared across the one or more video layers.

The following solutions show example embodiments of techniques discussed in the previous section (e.g., items 8, 9).

17. A video processing method, comprising: performing a conversion between a video comprising one or more video layers and a coded representation of the video according to a rule; wherein the coded representation is arranged into one or more network abstraction layer (NAL) units; wherein the coded representation comprises one or more adaptation parameter sets for controlling characteristics of the conversion.

18. The method of solution 17, wherein the rule specifies that all adaptation parameter sets having a particular type also share a same space value for respective identifier values.

19. The method of solution 17, wherein the rule specifies that the one or more video layers are disallowed to share a particular adaptation parameter set network abstraction layer unit.

20. The method of any of solutions 1 to 19, wherein the conversion comprises encoding the video into the coded representation.

21. The method of any of solutions 1 to 19, wherein the conversion comprises decoding the coded representation to generate pixel values of the video.

22. A video decoding apparatus comprising a processor configured to implement a method recited in one or more of solutions 1 to 21.

23. A video encoding apparatus comprising a processor configured to implement a method recited in one or more of solutions 1 to 21.

24. A computer program product having computer code stored thereon, the code, when executed by a processor, causes the processor to implement a method recited in any of solutions 1 to 21.

25. A method, apparatus or system described in the present document.

Figure 9:
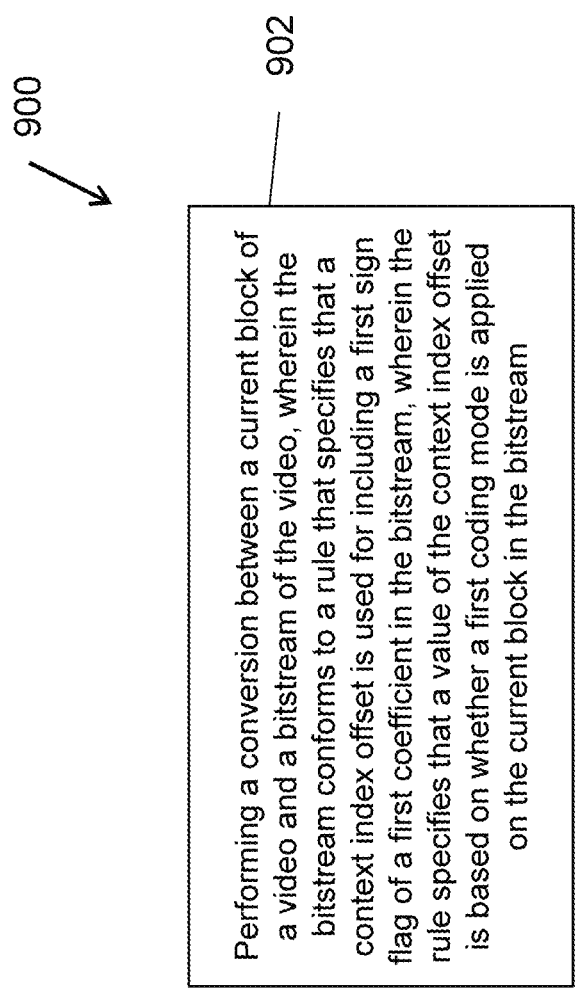
FIGS. 9 to 17 are flowcharts for example methods of video processing.

FIG. 9 is a flowchart for an example method 900 of video processing. Operation 902 includes performing a conversion between a current block of a video and a bitstream of the video, wherein the bitstream conforms to a rule that specifies that a context index offset is used for including a first sign flag of a first coefficient in the bitstream, wherein the rule specifies that a value of the context index offset is based on whether a first coding mode is applied on the current block in the bitstream.

In some embodiments of method 900, the rule specifies that the value of the context index offset is within a first range from N0 to N1, inclusive, in case that the first coding mode is not applied, and the rule specifies that the value of the context index offset is within a second range from N2 to N3, inclusive, in case that the first coding mode is applied. In some embodiments of method 900, in the first coding mode, a difference between a quantized residual and a prediction of the quantized residual is represented in the bitstream using a pulse coding modulation representation. In some embodiments of method 900, N0, N1, N2 and N3 are 0, 2, 3 and 5, respectively. In some embodiments of method 900, the value of the context index offset is equal to 0 or 3 in response to a first neighboring sign value and a second neighboring sign value meeting a first condition, and the first condition is: (1) the first neighboring sign value is equal to 0 and a second neighboring sign value is equal to 0, or (2) the first neighboring sign value is equal to a negative of the second neighboring sign value, and wherein the first neighboring sign value is equal to 0 in response to a horizontal coordinate of the first coefficient being 0 and is equal to a sign value of a left neighboring coefficient in response to the horizontal coordinate of the first coefficient not being zero, and wherein the second neighboring sign value is equal to 0 in response to a vertical coordinate of the first coefficient being 0 and is equal to a sign value of an above neighboring coefficient in response to the vertical coordinate of the first coefficient not being 0.

In some embodiments of method 900, the value of the context index offset is equal to 0 in response to the first coding mode not being applied on the current block, and the value of the context index offset is equal to 3 in response to the first coding mode being applied on the current block. In some embodiments of method 900, the value of the context index offset is equal to 1 or 4 in response to the first neighboring sign value and the second neighboring sign value not meeting the first condition and in response to the first neighboring sign value and the second neighboring sign value meeting a second condition, and the second condition is: (1) the first neighboring sign value is greater than or equal to 0 and the second neighboring sign value is greater than or equal to 0. In some embodiments of method 900, the value of the context index offset is equal to 1 in response to the first coding mode not being applied on the current block, and the value of the context index offset is equal to 4 in response to the first coding mode being applied on the current block. In some embodiments of method 900, the value of the context index offset is equal to 2 or 5 in response to the first neighboring sign value and the second neighboring sign value not meeting the first condition and the second condition.

In some embodiments of method 900, the value of the context index offset is equal to 2 in response to the first coding mode not being applied on the current block, and the value of the context index offset is equal to 5 in response to the first coding mode being applied on the current block. In some embodiments of method 900, a transform skip operation is applied to the current block. In some embodiments of method 900, the rule specifies that N0, N1, N3, and N3 are determined based on any one or more of: (1) an indication included in a sequence parameter set, a video parameter set, a picture parameter set, a picture header, a slice header, a tile group header, a largest coding unit row, group of largest coding unit, a largest coding unit, or a coding unit, (2) a block dimension of the current block and/or block dimensions of neighboring blocks of the current block, (3) a block shape of the current block and/or block shapes of neighboring blocks of the current block, (4) an indication of a color format of the video, (5) whether a separate or dual coding tree structure is applied to the current block, (6) a slice type and/or a picture type to which the current block belongs, and (7) a number of color components of the current block.

Figure 10:
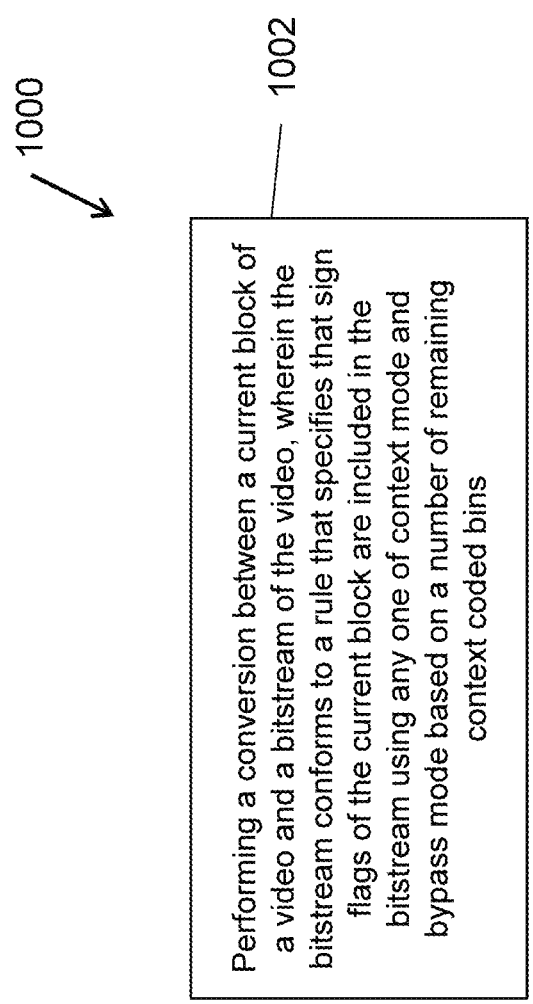

FIG. 10 is a flowchart for an example method 1000 of video processing. Operation 1002 includes performing a conversion between a current block of a video and a bitstream of the video, wherein the bitstream conforms to a rule that specifies that sign flags of the current block are included in the bitstream using any one of context mode and bypass mode based on a number of remaining context coded bins.

In some embodiments of method 1000, the rule specifies that the bypass mode is used for including the sign flags in the bitstream in response to the number of remaining context coded bins being less than N, where N is an integer. In some embodiments of method 1000, the rule specifies that the context mode is used for including the sign flags in the bitstream in response to the number of remaining context coded bins being greater than or equal to N, where N is an integer. In some embodiments of method 1000, the rule specifies that the bypass mode is used for including the sign flags in the bitstream in response to the number of remaining context coded bins being equal to N, where N is an integer. In some embodiments of method 1000, the rule specifies that the bypass mode is used for including the sign flags in the bitstream in response to the number of remaining context coded bins being greater than N, where N is an integer. In some embodiments of method 1000, N is equal to 4. In some embodiments of method 1000, N is equal to 0.

In some embodiments of method 1000, N is an integer based on: (1) an indication included in a sequence parameter set, a video parameter set, a picture parameter set, a picture header, a slice header, a tile group header, a largest coding unit row, group of largest coding unit, a largest coding unit, or a coding unit, (2) a block dimension of the current block and/or block dimensions of neighboring blocks of the current block, (3) a block shape of the current block and/or block shapes of neighboring blocks of the current block, (4) an indication of a color format of the video, (5) whether a separate or dual coding tree structure is applied to the current block, (6) a slice type and/or a picture type to which the current block belongs, and (7) a number of color components of the current block. In some embodiments of method 1000, the rule specifies that the current block is a transform block or a transform skip block. In some embodiments of method 1000, the rule specifies that a block differential pulse coded modulation mode is applied to the current block. In some embodiments of method 1000, the rule specifies that a block differential pulse coded modulation mode is not applied to the current block.

Figure 11:
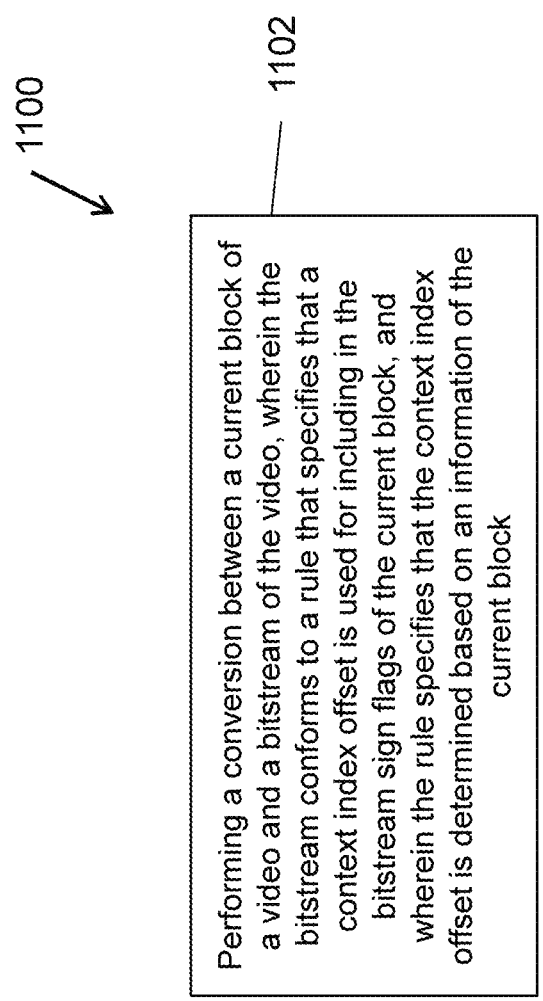

FIG. 11 is a flowchart for an example method 1100 of video processing. Operation 1102 includes performing a conversion between a current block of a video and a bitstream of the video, wherein the bitstream conforms to a rule that specifies that a context index offset is used for including in the bitstream sign flags of the current block, and wherein the rule specifies that the context index offset is determined based on an information of the current block.

In some embodiments of method 1100, the information includes an indication in a sequence parameter set, a video parameter set, a picture parameter set, a picture header, a slice header, a tile group header, a largest coding unit row, group of largest coding unit, a largest coding unit, or a coding unit. In some embodiments of method 1100, the information includes a block dimension of the current block and/or block dimensions of neighboring blocks of the current block. In some embodiments of method 1100, the information includes a block shape of the current block and/or block shapes of neighboring blocks of the current block. In some embodiments of method 1100, context values of the sign flags are separate for different block shapes. In some embodiments of method 1100, the information includes one or more prediction modes of one or more neighboring blocks of the current block. In some embodiments of method 1100, the one or more prediction modes includes an intra prediction mode. In some embodiments of method 1100, the one or more prediction modes includes an inter prediction mode.

In some embodiments of method 1100, context values of the sign flags are separate for one or more inter coded blocks and for one or more intra coded blocks. In some embodiments of method 1100, the information includes indication of block-based delta pulse code modulation modes of neighboring blocks of the current block. In some embodiments of method 1100, the information includes an indication of a color format of the video. In some embodiments of method 1100, the information includes whether a separate or dual coding tree structure is applied to the current block. In some embodiments of method 1100, the information includes a slice type and/or a picture type to which the current block belongs. In some embodiments of method 1100, the information includes a number of color components of the current block. In some embodiments of method 1100, context values of the sign flags are separate for luma color component of the current block and for chroma color component of the current block. In some embodiments of method(s) 900-1100, the current block is represented in the bitstream using a binary delta pulse code modulation mode.

Figure 12:
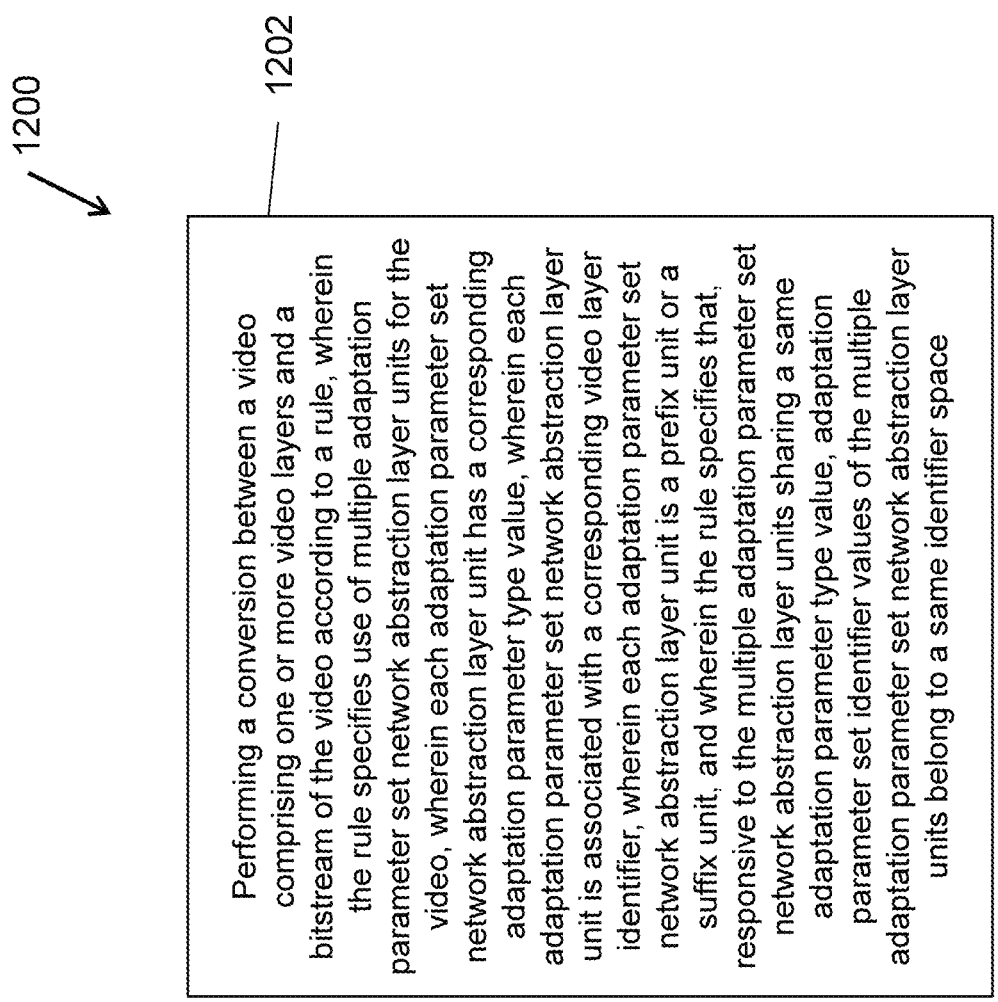

FIG. 12 is a flowchart for an example method 1200 of video processing. Operation 1202 includes performing a conversion between a video comprising one or more video layers and a bitstream of the video according to a rule, wherein the rule specifies use of multiple adaptation parameter set network abstraction layer units for the video, wherein each adaptation parameter set network abstraction layer unit has a corresponding adaptation parameter type value, wherein each adaptation parameter set network abstraction layer unit is associated with a corresponding video layer identifier, wherein each adaptation parameter set network abstraction layer unit is a prefix unit or a suffix unit, and wherein the rule specifies that, responsive to the multiple adaptation parameter set network abstraction layer units sharing a same adaptation parameter type value, adaptation parameter set identifier values of the multiple adaptation parameter set network abstraction layer units belong to a same identifier space.

In some embodiments of method 1200, the rule specifies that multiple adaptation parameter set network abstraction layer units share the same adaptation parameter type value independent of multiple video layer identifiers of the multiple adaptation parameter set network abstraction layer units. In some embodiments of method 1200, the rule specifies that the multiple adaptation parameter set network abstraction layer units share the same adaptation parameter type value independent of whether the multiple adaptation parameter set network abstraction layer units are the prefix unit or the suffix unit. In some embodiments of method 1200, the multiple adaptation parameter set network abstraction layer units are multiple first mode adaptation parameter set network abstraction layer units, wherein in a first mode, mapped luma prediction samples are derived based on a linear model and are further used to derive luma reconstructed samples, and chroma residual values are scaled based on the luma reconstrued samples. In some embodiments of method 1200, the multiple adaptation parameter set network abstraction layer units are multiple second mode adaptation parameter set network abstraction layer units, wherein in a second mode, luma reconstructed samples are filtered with a classification operation in which a filter index is generated based on difference between luma reconstructed samples in different directions, and chroma reconstructed samples are filtered without the classification operation.

Figure 13:
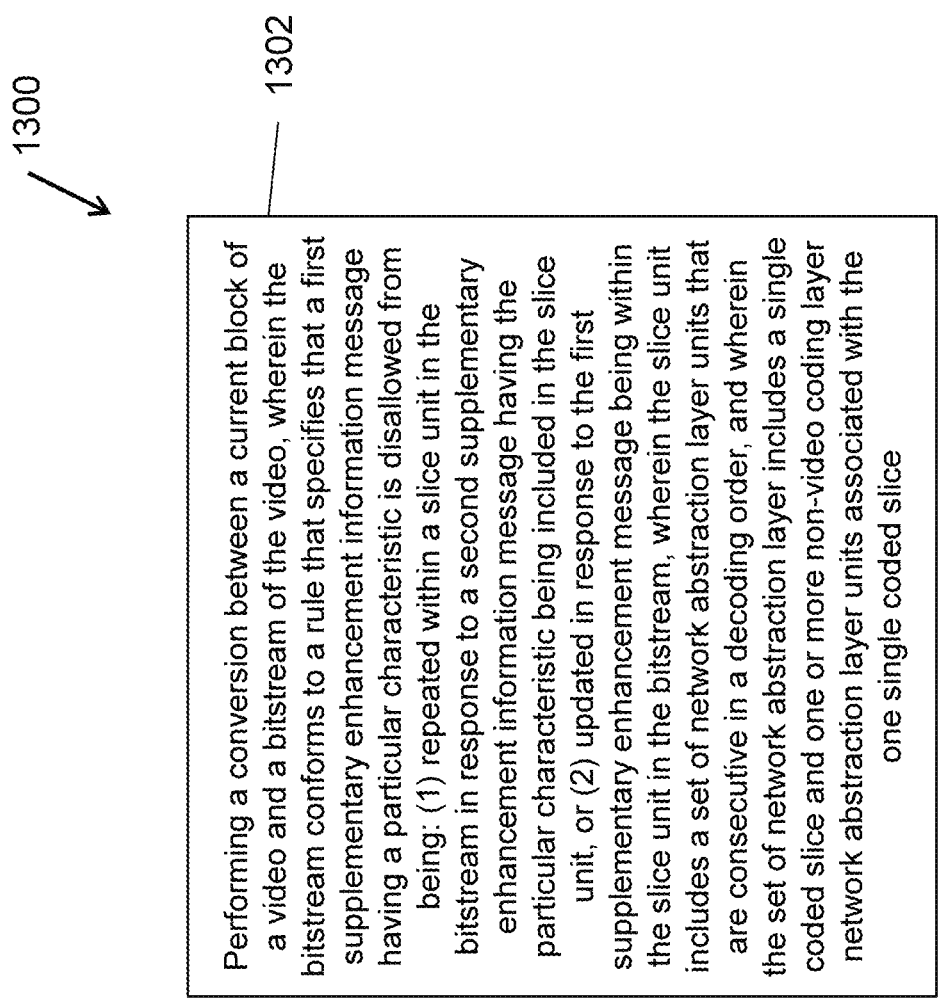

FIG. 13 is a flowchart for an example method 1300 of video processing. Operation 1302 includes performing a conversion between a current block of a video and a bitstream of the video, wherein the bitstream conforms to a rule that specifies that a first supplementary enhancement information message having a particular characteristic is disallowed from being: (1) repeated within a slice unit in the bitstream in response to a second supplementary enhancement information message having the particular characteristic being included in the slice unit, or (2) updated in response to the first supplementary enhancement message being within the slice unit in the bitstream, wherein the slice unit includes a set of network abstraction layer units that are consecutive in a decoding order, and wherein the set of network abstraction layer includes a single coded slice and one or more non-video coding layer network abstraction layer units associated with the one single coded slice.

In some embodiments of method 1300, the rule specifies that the first supplementary enhancement information message is disallowed from being repeated within the slice unit in response to the first supplementary enhancement information message having a value for a particular payload type that is same as that for the second supplementary enhancement information message included in the slice unit. In some embodiments of method 1300, the rule specifies that a number of identical syntax structures for the particular payload type within the slice unit is not greater than one. In some embodiments of method 1300, the rule specifies that the first supplementary enhancement information message is disallowed from being repeated within the slice unit in response to the first supplementary enhancement information message having a particular payload type. In some embodiments of method 1300, the rule specifies that that a number of syntax structures for the particular payload type within the slice unit is not greater than one.

In some embodiments of method 1300, the rule specifies that the first supplementary enhancement information message is disallowed from being updated within the slice unit in response to the first supplementary enhancement information message having a particular payload type. In some embodiments of method 1300, the rule specifies that that one or more syntax structures of the particular payload type within the slice unit have a same content.

Figure 14:
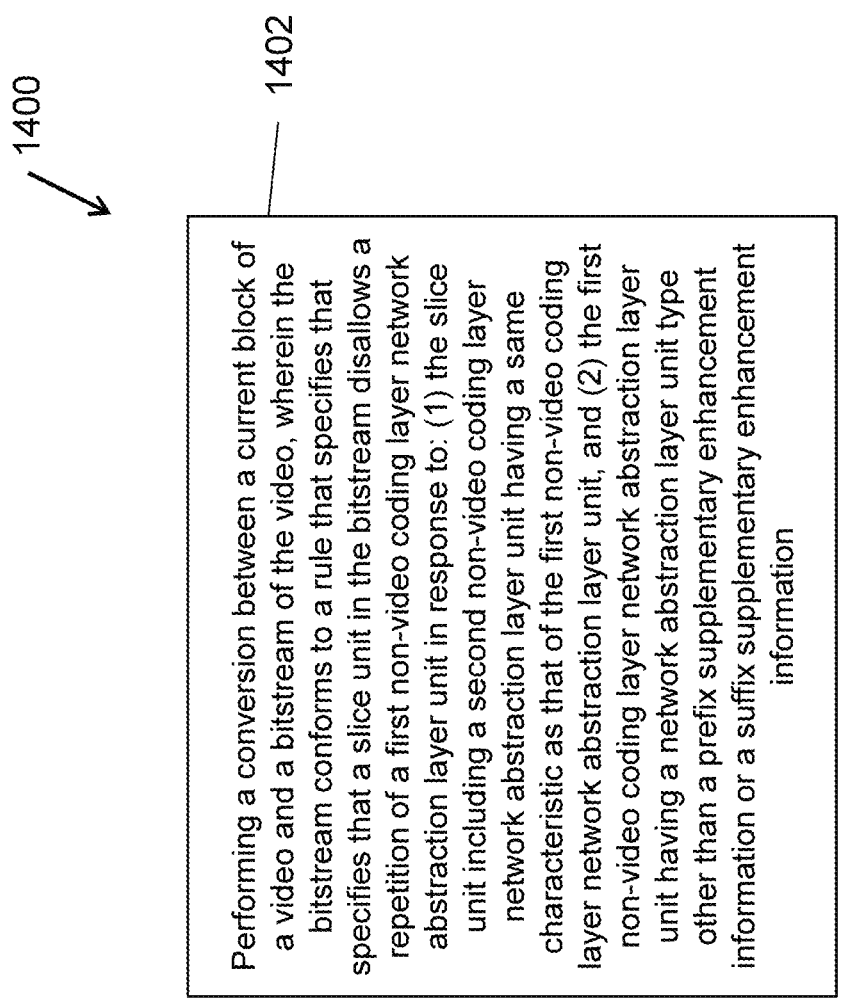

FIG. 14 is a flowchart for an example method 1400 of video processing. Operation 1402 includes performing a conversion between a current block of a video and a bitstream of the video, wherein the bitstream conforms to a rule that specifies that specifies that a slice unit in the bitstream disallows a repetition of a first non-video coding layer network abstraction layer unit in response to: (1) the slice unit including a second non-video coding layer network abstraction layer unit having a same characteristic as that of the first non-video coding layer network abstraction layer unit, and (2) the first non-video coding layer network abstraction layer unit having a network abstraction layer unit type other than a prefix supplementary enhancement information or a suffix supplementary enhancement information.

In some embodiments of method 1400, the second non-video coding layer network abstraction layer unit is a decoding capability information network abstraction layer unit, and wherein the rule specifies that a number of decoding capability information network abstraction layer units within the slice unit is not greater than 1. In some embodiments of method 1400, the second non-video coding layer network abstraction layer unit is a video parameter set network abstraction layer unit having a particular identifier, and the rule specifies that a number of video parameter set network abstraction layer units with the particular identifier within the slice unit is not greater than 1. In some embodiments of method 1400, the second non-video coding layer network abstraction layer unit is a sequence parameter set network abstraction layer unit having a particular identifier, and the rule specifies that a number of sequence parameter set network abstraction layer units with the particular identifier within the slice unit is not greater than 1. In some embodiments of method 1400, the second non-video coding layer network abstraction layer unit is a picture parameter set network abstraction layer unit having a particular identifier, and the rule specifies that a number of picture parameter set network abstraction layer units with the particular identifier within the slice unit shall not be greater than 1.

In some embodiments of method 1400, the second non-video coding layer network abstraction layer unit is an adaptation parameter set network abstraction layer unit having a particular identifier and a particular parameter type, and the rule specifies that a number of adaptation parameter set network abstraction layer units with the particular identifier and the particular parameter type within the slice unit is not greater than 1. In some embodiments of method 1400, the second non-video coding layer network abstraction layer unit is an adaptation parameter set network abstraction layer unit having a particular type of network abstraction layer unit, a particular identifier, and a particular parameter type, and the rule specifies that a number of adaptation parameter set network abstraction layer units with the particular type of network abstraction layer unit, the particular identifier, and the particular parameter type within the slice unit is not greater than 1. In some embodiments of method 1400, the second non-video coding layer network abstraction layer unit is a decoding capability information network abstraction layer unit, and the rule specifies that the first non-video coding layer network abstraction layer unit is disallowed from being repeated within a coded layer video sequence or a coded video sequence in response to the first non-video coding layer network abstraction layer unit being the decoding capability information network abstraction layer unit.

In some embodiments of method 1400, the second non-video coding layer network abstraction layer unit is a video parameter set network abstraction layer unit having a particular identifier, and the rule specifies that the first non-video coding layer network abstraction layer unit is disallowed from being repeated within a coded layer video sequence or a coded video sequence in response to the first non-video coding layer network abstraction layer unit being the video parameter set network abstraction layer unit having the particular identifier. In some embodiments of method 1400, the second non-video coding layer network abstraction layer unit is a sequence parameter set network abstraction layer unit having a particular identifier, and the rule specifies that the first non-video coding layer network abstraction layer unit is disallowed from being repeated within a coded layer video sequence or a coded video sequence in response to the first non-video coding layer network abstraction layer unit being the sequence parameter set network abstraction layer unit having the particular identifier.

Figure 15:
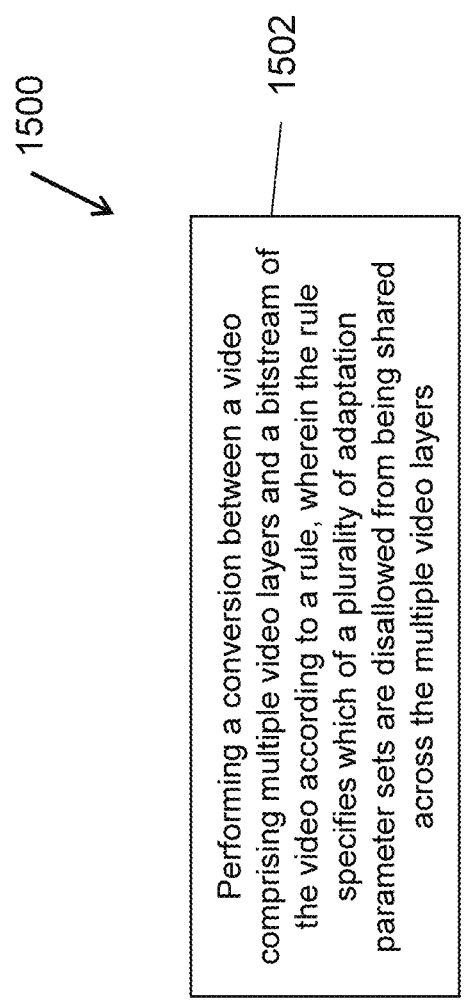

FIG. 15 is a flowchart for an example method 1500 of video processing. Operation 1502 includes performing a conversion between a video comprising multiple video layers and a bitstream of the video according to a rule, wherein the rule specifies which of a plurality of adaptation parameter sets are disallowed from being shared across the multiple video layers.

In some embodiments of method 1500, the rule specifies that all of the plurality of adaptation parameter sets are disallowed from being shared. In some embodiments of method 1500, the rule specifies that adaptive loop filter type of the plurality of adaptation parameter sets are disallowed form being shared.

Figure 16:
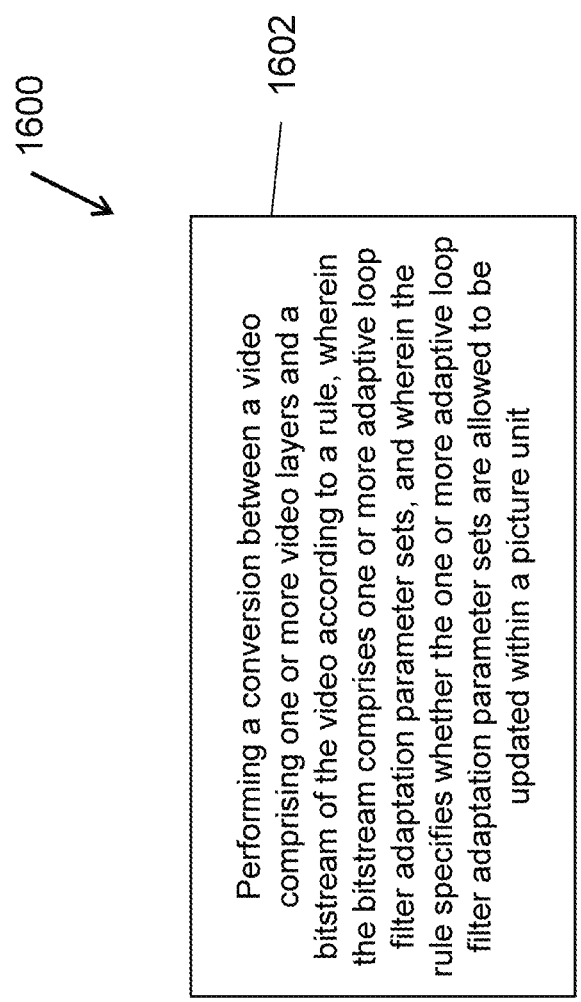

FIG. 16 is a flowchart for an example method 1600 of video processing. Operation 1602 includes performing a conversion between a video comprising one or more video layers and a bitstream of the video according to a rule, wherein the bitstream comprises one or more adaptive loop filter adaptation parameter sets, and wherein the rule specifies whether the one or more adaptive loop filter adaptation parameter sets are allowed to be updated within a picture unit.

In some embodiments of method 1600, the rule specifies that the one or more adaptive loop filter adaptation parameter sets are allowed to be updated within the picture unit. In some embodiments of method 1600, the rule specifies that no adaptation parameter set is allowed to be updated within the picture unit.

Figure 17:
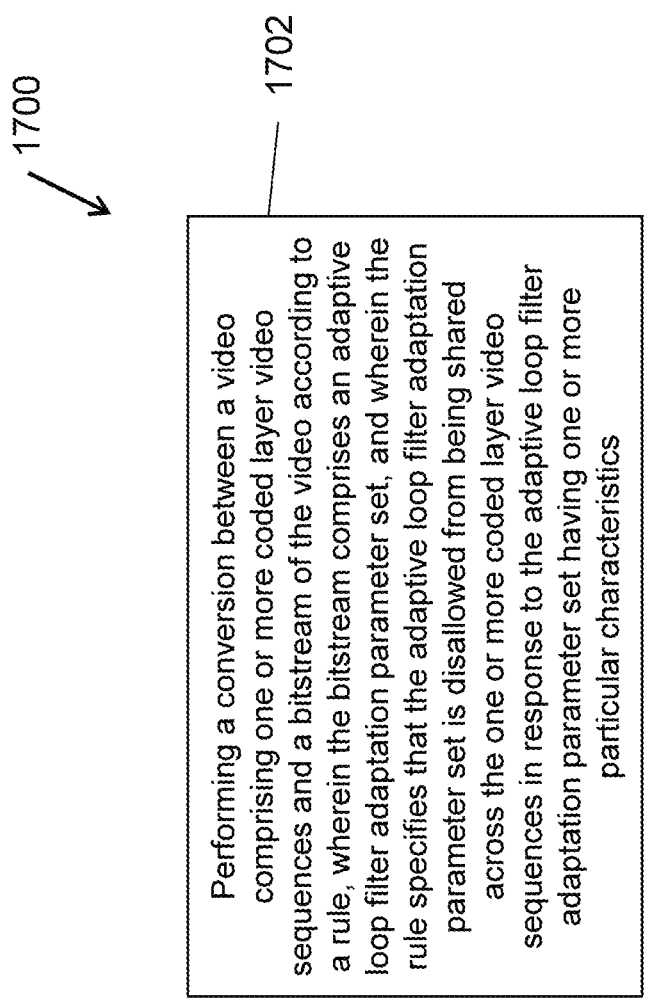

FIG. 17 is a flowchart for an example method 1700 of video processing. Operation 1702 includes performing a conversion between a video comprising one or more coded layer video sequences and a bitstream of the video according to a rule, wherein the bitstream comprises an adaptive loop filter adaptation parameter set, and wherein the rule specifies that the adaptive loop filter adaptation parameter set is disallowed from being shared across the one or more coded layer video sequences in response to the adaptive loop filter adaptation parameter set having one or more particular characteristics.

In some embodiments of method 1700, the one or more particular characteristics include the adaptive loop filter adaptation parameter set having a particular network abstraction layer unit type. In some embodiments of method 1700, the one or more particular characteristics include the adaptive loop filter adaptation parameter set having a particular identifier. In some embodiments of method 1700, the one or more particular characteristics include the adaptive loop filter adaptation parameter set having a particular parameter type. In some embodiments of method 1700, the rule specifies that the adaptive loop filter adaptation parameter set referred to by a video coding layer network abstraction layer unit in a first coded layer video sequence is not associated with a non-video coding layer network abstraction layer unit in a second coded layer video sequence, and the first coded layer video sequence is different from the second coded layer video sequence. In some embodiments of method 1700, the rule specifies that the adaptive loop filter adaptation parameter set referred to by a video coding layer network abstraction layer unit associated with a first intra random access picture is not associated with a non-video coding layer network abstraction layer unit associated with a second intra random access picture, and the first intra random access picture is different from the second intra random access picture.

In some embodiments of method 1700, the rule specifies that the adaptive loop filter adaptation parameter set referred to by a video coding layer network abstraction layer unit associated with a first intra random access picture or a first gradual decoding refresh picture is not associated with a non-video coding layer network abstraction layer unit associated with a second intra random access picture or a second gradual decoding refresh picture, and the first intra random access picture or the first gradual decoding refresh picture is different from the second intra random access picture or the second gradual decoding refresh picture. In some embodiments of method 1700, the rule specifies that the adaptive loop filter adaptation parameter set is included in one or more adaptation parameter sets of the video that are not shared across one or more coded video sequences of the video. In some embodiments of method 1700, the rule specifies that the one or more adaptation parameter sets belonging to a particular type are disallowed from being shared across the one or more coded video sequences. In some embodiments of method 1700, the particular type includes an adaptive loop filter adaptation parameter set. In some embodiments of method 1700, the particular type includes a luma mapping with chroma scaling adaptation parameter set. In some embodiments of method 1700, the particular type includes a scaling adaptation parameter set.

In some embodiments of method(s) 900-1700, the performing the conversion comprising encoding the video into the bitstream. In some embodiments of method(s) 900-1700, the performing the conversion comprises generating the bitstream from the video, and the method further comprises storing the bitstream in a non-transitory computer-readable recording medium. In some embodiments of method(s) 900-1700, the performing the conversion comprises decoding the video from the bitstream. In some embodiments, a video decoding apparatus comprising a processor configured to implement operations described for method(s) 900-1700.

In some embodiments, a video encoding apparatus comprising a processor configured to implement operations described for method(s) 900-1700. In some embodiments, a computer program product having computer instructions stored thereon, the instructions, when executed by a processor, causes the processor to implement operations described for method(s) 900-1700. In some embodiments, a non-transitory computer-readable storage medium that stores a bitstream generated according to the operations described for method(s) 900-1700. In some embodiments, a non-transitory computer-readable storage medium storing instructions that cause a processor to implement operations described for method(s) 900-1700. In some embodiments, a method of bitstream generation, comprising: generating a bitstream of a video according to operations described for method(s) 900-1700, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
   performing a conversion between a current block of a video and a bitstream of the video,
   wherein the bitstream conforms to a second rule that specifies use of multiple adaptation parameter set network abstraction layer units for the video,
   wherein each adaptation parameter set network abstraction layer unit has a corresponding adaptation parameter set type value,
   wherein each adaptation parameter set network abstraction layer unit is associated with a corresponding video layer identifier,
   wherein each adaptation parameter set network abstraction layer unit is a prefix unit or a suffix unit, and
   wherein the second rule specifies that, responsive to the multiple adaptation parameter set network abstraction layer units having a particular adaptation parameter set type value, independent of multiple video layer identifiers of the multiple adaptation parameter set network abstraction layer units, and whether the multiple adaptation parameter set network abstraction layer units are the prefix unit or the suffix unit, adaptation parameter set identifier values of the multiple adaptation parameter set network abstraction layer units belong to a same adaptation parameter set identifier value space, which means that the adaptation parameter set identifier values of each of the multiple adaptation parameter set network abstraction layer units with the particular adaptation parameter set type value are different from each other within the shared value space.

2. The method of claim 1, wherein the bitstream conforms to a first rule that specifies that a context increment is used for including a first sign flag of a first coefficient in the bitstream, and
   wherein the first rule specifies that a value of the context increment is based on whether a first coding mode is applied on the current block.

3. The method of claim 2, wherein the first rule specifies that the value of the context increment is within a first range from N0 to N1, inclusive, when the first coding mode is not applied, and
   wherein the first rule specifies that the value of the context increment is within a second range from N2 to N3, inclusive, when the first coding mode is applied.

4. The method of claim 3, wherein, in the first coding mode, a difference between a quantized residual and a prediction of the quantized residual is represented in the bitstream using a pulse coding modulation representation.

5. The method of claim 3, wherein the first coding mode is a block-based delta pulse code modulation coding mode.

6. The method of claim 3, wherein N0, N1, N2, and N3 are 0, 2, 3, and 5, respectively.

7. The method of claim 2, wherein the value of the context increment is equal to 0 or 3 when a first neighboring sign value and a second neighboring sign value meet a first condition, and the first condition is:
   (1) the first neighboring sign value is equal to 0 and the second neighboring sign value is equal to 0, or
   (2) the first neighboring sign value is equal to a negative of the second neighboring sign value.

8. The method of claim 7, wherein the first neighboring sign value is equal to 0 when a horizontal coordinate of a current coefficient scan location is 0 and is equal to a sign value of a left neighboring coefficient when the horizontal coordinate of the current coefficient scan location is not zero, and
   wherein the second neighboring sign value is equal to 0 when a vertical coordinate of the current coefficient scan location is 0 and is equal to a sign value of an above neighboring coefficient when the vertical coordinate of the first coefficient is not 0.

9. The method of claim 7, wherein the value of the context increment is equal to 0 when the first coding mode is not applied on the current block, and the value of the context increment is equal to 3 when the first coding mode is applied on the current block.

10. The method of claim 7, wherein the value of the context increment is equal to 1 or 4 when the first neighboring sign value and the second neighboring sign value do not meet the first condition and when the first neighboring sign value and the second neighboring sign value meet a second condition, and the second condition is:
    (1) the first neighboring sign value is greater than or equal to 0 and the second neighboring sign value is greater than or equal to 0.

11. The method of any of claim 10, wherein the value of the context increment is equal to 1 when the first coding mode is not applied on the current block, and the value of the context increment is equal to 4 when the first coding mode is applied on the current block.

12. The method of claim 10, wherein the value of the context increment is equal to 2 or 5 when the first neighboring sign value and the second neighboring sign value do not meet the first condition and the second condition.

13. The method of claim 12, wherein the value of the context increment is equal to 2 when the first coding mode is not applied on the current block, and the value of the context increment is equal to 5 when the first coding mode is applied on the current block.

14. The method of claim 2, wherein a transform skip operation is applied to the current block.

15. The method of claim 1, wherein the performing the conversion comprises encoding the video into the bitstream.

16. The method of claim 1, wherein the performing the conversion comprises decoding the video from the bitstream.

17. An apparatus for processing video data comprising a processor and a non-transitory memory with instructions thereon, wherein the instructions upon execution by the processor, cause the processor to:
perform a conversion between a current block of a video and a bitstream of the video,
wherein the bitstream conforms to a second rule that specifies use of multiple adaptation parameter set network abstraction layer units for the video,
wherein each adaptation parameter set network abstraction layer unit has a corresponding adaptation parameter set type value,
wherein each adaptation parameter set network abstraction layer unit is associated with a corresponding video layer identifier,
wherein each adaptation parameter set network abstraction layer unit is a prefix unit or a suffix unit, and
wherein the second rule specifies that, responsive to the multiple adaptation parameter set network abstraction layer units having a particular adaptation parameter set type value, independent of multiple video layer identifiers of the multiple adaptation parameter set network abstraction layer units, and whether the multiple adaptation parameter set network abstraction layer units are the prefix unit or the suffix unit, adaptation parameter set identifier values of the multiple adaptation parameter set network abstraction layer units belong to a same adaptation parameter set identifier value space, which means that the adaptation parameter set identifier values of each of the multiple adaptation parameter set network abstraction layer units with the particular adaptation parameter set type value are different from each other within the shared value space.

18. The apparatus of claim 17, wherein the bitstream conforms to a first rule that specifies that a context increment is used for including a first sign flag of a first coefficient in the bitstream, and
wherein the first rule specifies that a value of the context increment is based on whether a first coding mode is applied on the current block.

19. A non-transitory computer-readable storage medium storing instructions that cause a processor to:
perform a conversion between a current block of a video and a bitstream of the video,
wherein the bitstream conforms to a second rule that specifies use of multiple adaptation parameter set network abstraction layer units for the video,
wherein each adaptation parameter set network abstraction layer unit has a corresponding adaptation parameter set type value,
wherein each adaptation parameter set network abstraction layer unit is associated with a corresponding video layer identifier,
wherein each adaptation parameter set network abstraction layer unit is a prefix unit or a suffix unit, and
wherein the second rule specifies that, responsive to the multiple adaptation parameter set network abstraction layer units having a particular adaptation parameter set type value, independent of multiple video layer identifiers of the multiple adaptation parameter set network abstraction layer units, and whether the multiple adaptation parameter set network abstraction layer units are the prefix unit or the suffix unit, adaptation parameter set identifier values of the multiple adaptation parameter set network abstraction layer units belong to a same adaptation parameter set identifier value space, which means that the adaptation parameter set identifier values of each of the multiple adaptation parameter set network abstraction layer units with the particular adaptation parameter set type value are different from each other within the shared value space.

20. A method for storing a bitstream of a video, comprising:
generating the bitstream of the video; and
storing the bitstream in a non-transitory computer-readable recording medium,
wherein the bitstream conforms to a second rule that specifies use of multiple adaptation parameter set network abstraction layer units for the video,
wherein each adaptation parameter set network abstraction layer unit has a corresponding adaptation parameter set type value,
wherein each adaptation parameter set network abstraction layer unit is associated with a corresponding video layer identifier,
wherein each adaptation parameter set network abstraction layer unit is a prefix unit or a suffix unit, and
wherein the second rule specifies that, responsive to the multiple adaptation parameter set network abstraction layer units having a particular adaptation parameter set type value, independent of multiple video layer identifiers of the multiple adaptation parameter set network abstraction layer units, and whether the multiple adaptation parameter set network abstraction layer units are the prefix unit or the suffix unit, adaptation parameter set identifier values of the multiple adaptation parameter set network abstraction layer units belong to a same adaptation parameter set identifier value space, which means that the adaptation parameter set identifier values of each of the multiple adaptation parameter set network abstraction layer units with the particular adaptation parameter set type value are different from each other within the shared value space.

* * * * *